(12) United States Patent
Nadkarni et al.

(10) Patent No.: US 12,366,512 B2
(45) Date of Patent: Jul. 22, 2025

(54) METHODS AND SYSTEMS FOR NON-DESTRUCTIVE ESTIMATION OF SCATTERING PARTICLE SIZE

(71) Applicant: The General Hospital Corporation, Boston, MA (US)

(72) Inventors: Seemantini Nadkarni, Boston, MA (US); Zeinab Hajjarian-Kashany, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 235 days.

(21) Appl. No.: 17/759,738

(22) PCT Filed: Feb. 1, 2021

(86) PCT No.: PCT/US2021/016066
§ 371 (c)(1),
(2) Date: Jul. 29, 2022

(87) PCT Pub. No.: WO2021/155361
PCT Pub. Date: Aug. 5, 2021

(65) Prior Publication Data
US 2023/0083866 A1 Mar. 16, 2023

Related U.S. Application Data

(60) Provisional application No. 62/968,308, filed on Jan. 31, 2020.

(51) Int. Cl.
*G01N 15/0205* (2024.01)
*G01N 15/01* (2024.01)

(52) U.S. Cl.
CPC ......... *G01N 15/0211* (2013.01); *G01N 15/01* (2024.01); *G01N 2015/0222* (2013.01)

(58) Field of Classification Search
CPC ............... G01N 15/0211; G01N 15/01; G01N 2015/0222; G01B 9/02083; G01B 9/02094; G01B 2290/70
See application file for complete search history.

(56) References Cited

U.S. PATENT DOCUMENTS

| 6,100,976 A | 8/2000 | Ackerson |
| 10,359,361 B2 | 7/2019 | Nadkarni et al. |
| (Continued) | | |

OTHER PUBLICATIONS

Hajjarian, Z., Nadkarni, S. Evaluating the Viscoelastic Properties of Tissue from Laser Speckle Fluctuations. Sci Rep 2, 316 (2012). https://doi.org/10.1038/srep00316 (Year: 2012).*

(Continued)

*Primary Examiner* — Kara E. Geisel
*Assistant Examiner* — Jonathon Cook
(74) *Attorney, Agent, or Firm* — QUARLES & BRADY LLP

(57) ABSTRACT

A method for non-destructively estimating an average size of scattering particles in a sample, including: transmitting, using a coherent light source, polarized light to the sample; obtaining, using a detector, polarized light reflected from the sample, the polarized light comprising a parallel polarized component and a perpendicular polarized component; determining, using a processor, speckle decorrelation rates for the parallel polarized component and the perpendicular polarized component; and estimating, using the processor, the average size of scattering particles in the sample based on the speckle decorrelation rates for the parallel polarized component and the perpendicular polarized component.

20 Claims, 22 Drawing Sheets

(56) References Cited

U.S. PATENT DOCUMENTS

| | | | |
|---|---|---|---|
| 11,328,185 B2* | 5/2022 | Zhou | G06T 7/246 |
| 2002/0135752 A1* | 9/2002 | Sokolov | A61B 5/444 |
| | | | 356/39 |
| 2012/0008143 A1 | 1/2012 | Ihlefeld et al. | |
| 2015/0276571 A1 | 10/2015 | Hajjarian et al. | |
| 2017/0003271 A1 | 1/2017 | Nadkarmi et al. | |
| 2017/0248518 A1* | 8/2017 | Nadkarni | G01N 21/4795 |
| 2019/0049354 A1* | 2/2019 | Nadkarni | G01N 21/4738 |

OTHER PUBLICATIONS

Wenbo Sun et al, For the depolarization of linearly polarized light by smoke particles, Journal of Quantitative Spectroscopy and Radiative Transfer,vol. 122, 2013,pp. 233-237, ISSN 0022-4073, https://doi.org/10.1016/j.jqsrt.2012.03.031 (Year: 2013).*
A. Dogariu, C. Kutsche, P. Likamwa, G. Boreman, and B. Moudgil, "Time-domain depolarization of waves retroreflected from dense colloidal media," Opt. Lett. 22, 585-587 (1997) (Year: 1997).*
Vinayakrishnan Rajan et al, Speckle size and decorrelation time; space-time correlation analysis of coherent light dynamically scattered from turbid media,Optics Communications, vol. 281, Issue 6, 2008, pp. 1755-1760, ISSN 0030-4018, https://doi.org/10.1016/j.optcom.2007.11.025. (Year: 2008).*
Dmitry A. Zimnyakov, Valery V. Tuchin, and Arjun G. Yodh "Characteristic scales of optical field depolarization and decorrelation for multiple scattering media and tissues," Journal of Biomedical Optics 4(1), (Jan. 1, 1999). https://doi.org/10.1117/1.429902 (Year: 1999).*
Acerbi et al., Human Breast Cancer Invasion and Aggression Correlates with ECM Stiffening and Immune Cell Infiltration, Integrative Biology, 2015, 7(10):1120-1134.
Ahmad et al., Magnetomotive Optical Coherence Elastography Using Magnetic Particles to Induce Mechanical Waves, Biomedical Optics Express, 2014, 5(7):2349-2361.
Bartek et al., Estimation of Subcellular Particle Size Histograms with Electron Microscopy for Prediction of Optical Scattering in Breast Tissue, Journal of Biomedical Optics, 2006, 11(6):064007, pp. 1-10.
Butcher et al., A Tense Situation: Forcing Tumour Progression, Nature Reviews Cancer, 2009, 9(2):108-122.
Clark et al., Modes of Cancer Cell Invasion and the Role of the Microenvironment, Current Opinion in Cell Biology, 2015, 36:13-22.
Denis et al., Correlating Tumor Stiffness with Immunohistochemical Subtypes of Breast Cancers: Prognostic Value of Comb-Push Ultrasound Shear Elastography for Differentiating Luminal Subtypes, PloS One, 2016, 11(10):e0165003, 14 pages.
Friedl et al., Cancer Invasion and the Microenvironment: Plasticity and Reciprocity, Cell, 2011, 147(5):992-1009.
Hajjarian et al., Intravascular Laser Speckle Imaging Catheter for the Mechanical Evaluation of the Arterial Wall, Journal of Biomedical Optics, 2011, 16(2):026005, pp. 1-7.
Hajjarian et al., Evaluation and Correction for Optical Scattering Variations in Laser Speckle Rheology of Biological Fluids, PloS One, 2013, 8(5):e65014, pp. 1-12.
Hajjarian et al., Correction of Optical Absorption and Scattering Variations in Laser Speckle Rheology Measurements, Optics Express, 2014, 22(6):6349-6361.
Hajjarian et al., Estimation of Particle Size Variations for Laser Speckle Rheology of Materials, Optics Letters, 2015, 40(5):764-767.
Hajjarian et al., Tutorial on Laser Speckle Rheology: Technology, Applications, and Opportunities, Journal of Biomedical Optics, 2020, 25(5):050801, pp. 1-19.
Jeon et al., Laser Speckle Decorrelation Time-Based Platelet Function Testing in Microfluidic System, Scientific Reports, 2019, 9(1):16514, pp. 1-8.
Kennedy et al., The Emergence of Optical Elastography in Biomedicine, Nature Photonics, 2017, 11(4):215-221.
Larin et al., Optical Coherence Elastography—OCT at Work in Tissue Biomechanics [Invited], Biomedical Optics Express, 2017, 8(2):1172-1202.
McKnight et al., MR Elastography of Breast Cancer: Preliminary Results, American Journal of Roentgenology, 2002, 178(6):1411-1417.
Nadkarni et al., Characterization of Atherosclerotic Plaques by Laser Speckle Imaging, Circulation, 2005, 112(6):885-892.
Nadkarni et al., Measurement of Fibrous Cap Thickness in Atherosclerotic Plaques by Spatiotemporal Analysis of Laser Speckle Images, Journal of Biomedical Optics, 2006, 11(2):021006, pp. 1-8.
Nadkarni et al., Laser Speckle Imaging of Atherosclerotic Plaques Through Optical Fiber Bundles, Journal of Biomedical Optics, 2008, 13(5):054016, pp. 1-6.
Provenzano et al., Collagen Reorganization at the Tumor-Stromal Interface Facilitates Local Invasion, BMC Medicine, 2006, 4(1):1-15.
Samani et al., Elastic Moduli of Normal and Pathological Human Breast Tissues: An Inversion-Technique-Based Investigation of 169 Samples, Physics in Medicine & Biology, 2007, 52(6):1565-1576.
Weitz et al., Chapter 16, Diffusing-wave Spectroscopy, in Dynamic Light Scattering: The Method and Some Applications, Oxford University Press, 1993, pp. 652-720.
PCT International Search Report and Written Opinion, PCT/US2021/016066, Jul. 9, 2021, 12 pages.
Kuznetsova, L. et al., Study of Relaxation of Thermally Treated Collagenous Tissues with the Cumulant Analysis of Speckle Intensity Fluctuations, Saratov Fall Meeting 2004: Coherent Optics of Ordered and Random Media V, Proceedings of SPIE, 2005, vol. 5772, pp. 139-143.
European Patent Office, Extended Search Report, Application No. 21747699.3, Jan. 30, 2024, 10 pages.

* cited by examiner

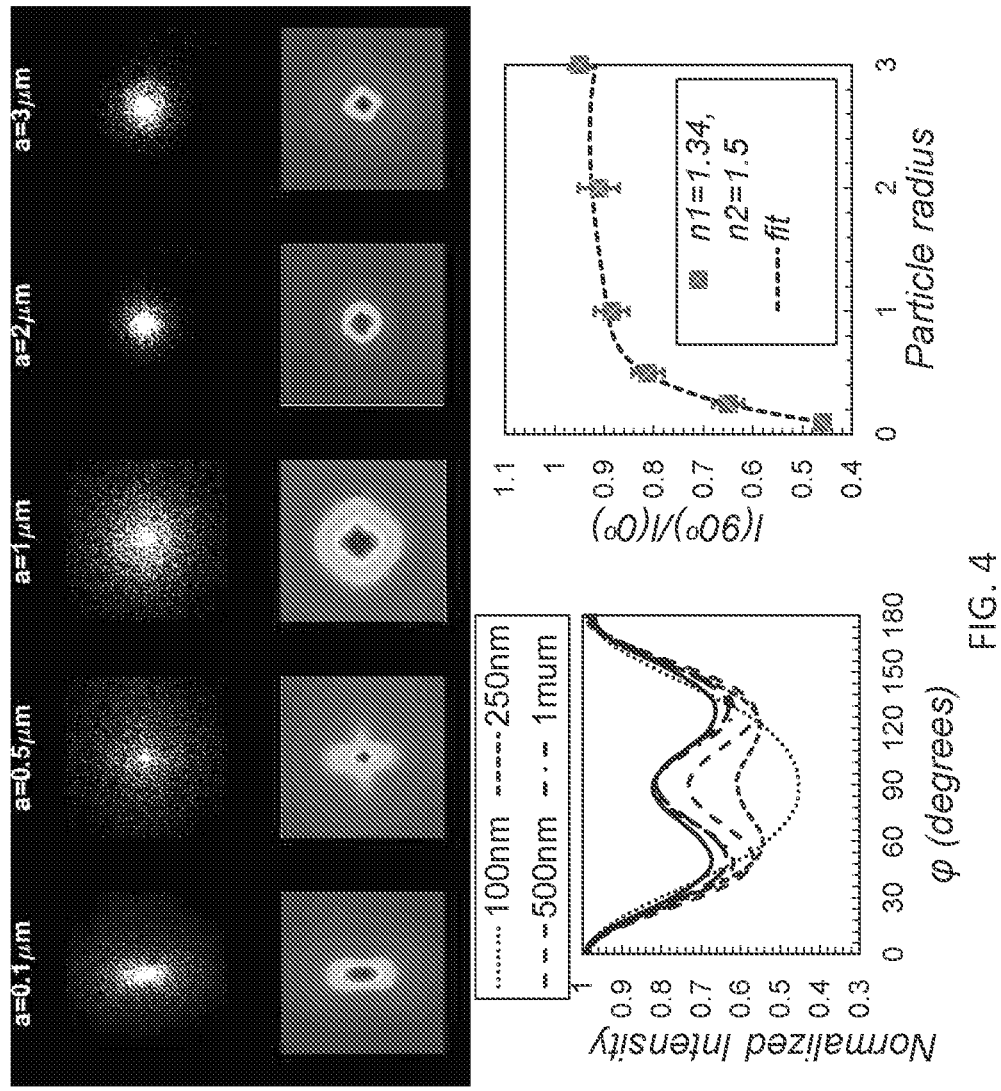
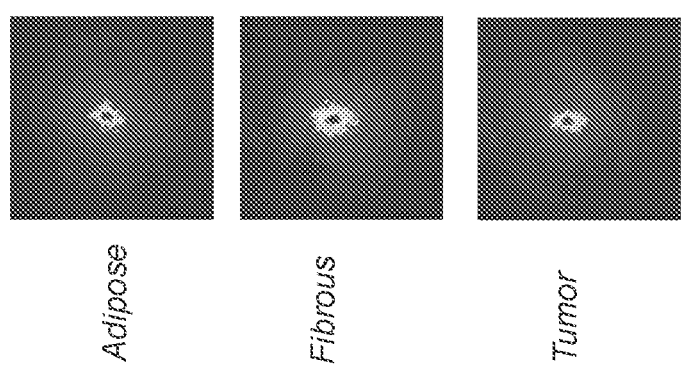
FIG. 4

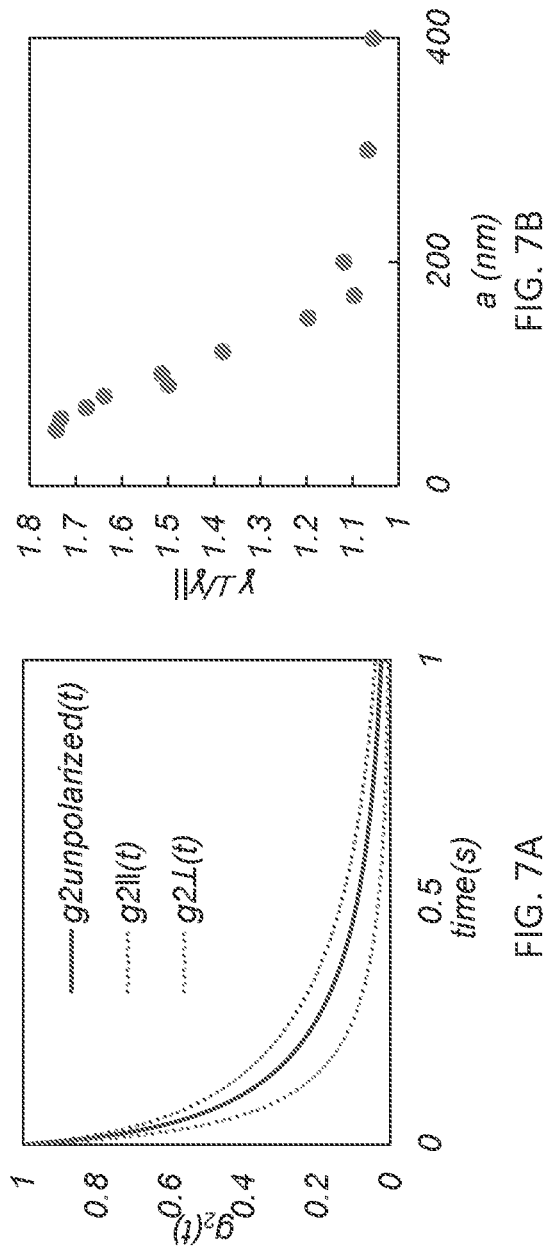

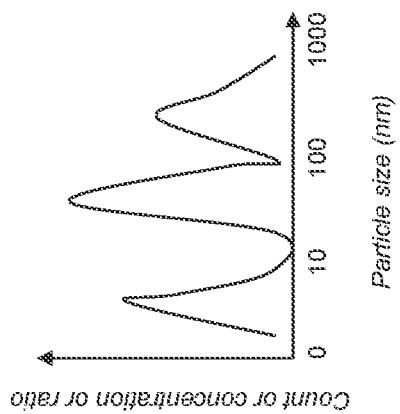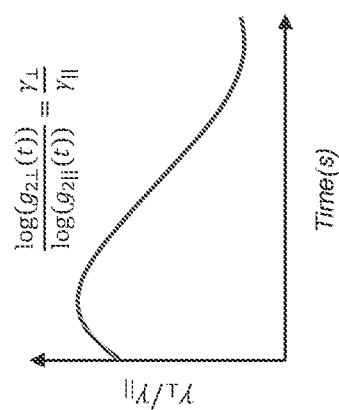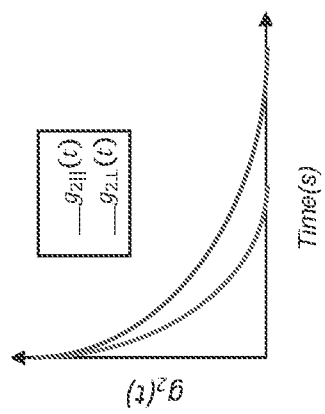
FIG. 7C

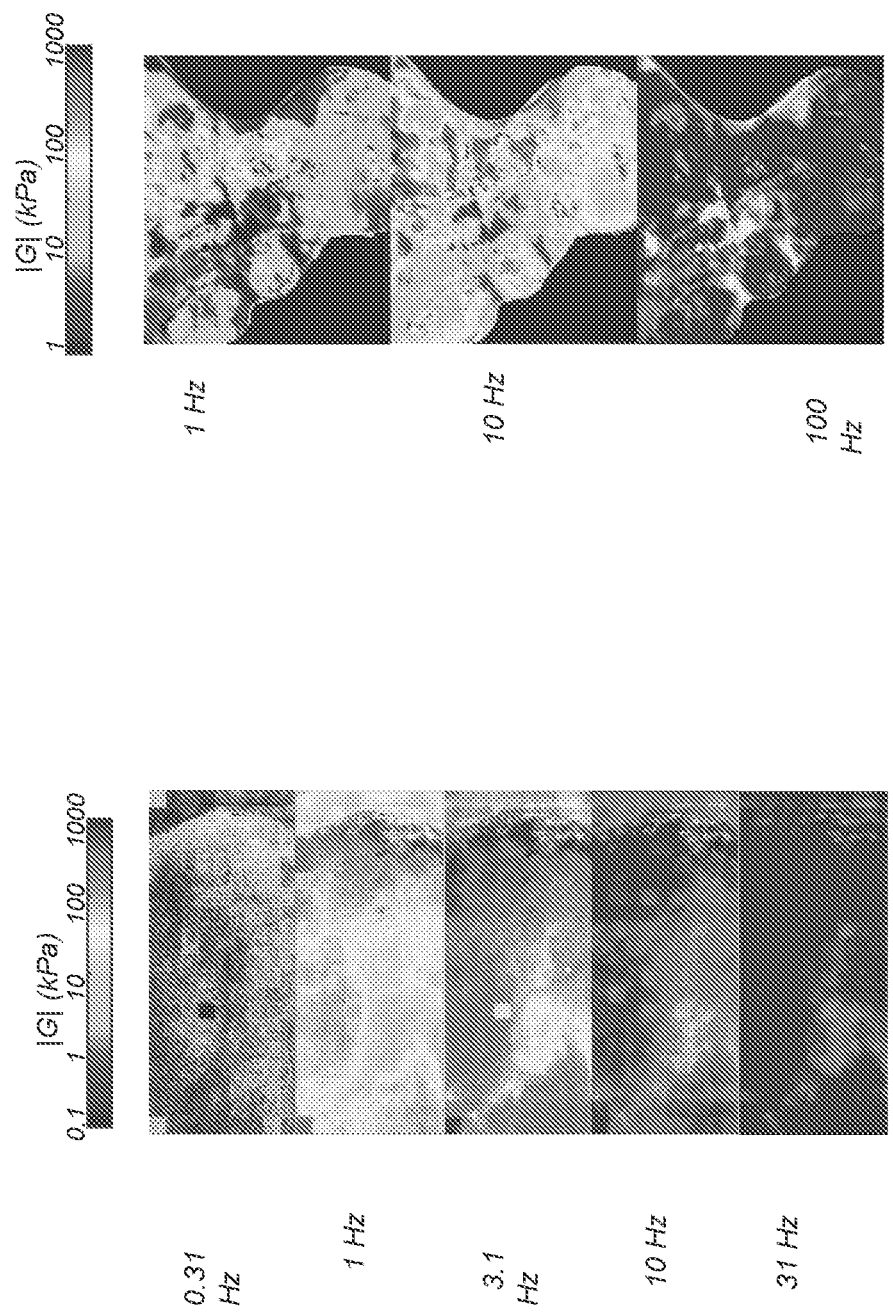

METHODS AND SYSTEMS FOR NON-DESTRUCTIVE ESTIMATION OF SCATTERING PARTICLE SIZE

CROSS REFERENCE TO RELATED APPLICATIONS

The present application is a U.S. National Phase of PCT Application PCT/US2021/016066 filed on Feb. 1, 2021 which claims priority from U.S. patent application Ser. No. 62/968,308, filed on Jan. 31, 2020. Each of the preceding patent applications is incorporated herein by reference in their entireties.

STATEMENT REGARDING FEDERALLY SPONSORED RESEARCH

This invention was made with government support under grant number 5R01HL142272 awarded by NIH. The government has certain rights in the invention.

BACKGROUND

Current imaging techniques are not well suited for estimating the size distribution of scattering particles within turbid materials, such as tissue, in a non-invasive manner. In some cases researchers have used destructive techniques such as electron microscopy to assess the size scales of refractive index heterogeneities and mismatches that represent the size scales of scattering particle sizes. In addition, other optical approaches have been developed that allow for estimating the size distribution in extremely dilute liquid samples. Nevertheless, these techniques are not suitable for use with live biological tissues or biomaterials in their native states.

SUMMARY OF THE INVENTION

Accordingly, the methods and systems disclosed herein address one or more issue identified above by facilitating the sizing of scattering particles in both liquid and solid specimens using non-ionizing light rays and without contacting the specimen or manipulating it in any way.

In one embodiment, the invention provides a method for non-destructively estimating an average size of scattering particles in a sample, including: transmitting, using a coherent light source, polarized light, for instance linearly polarized light, to the sample; obtaining, using a detector, polarized light reflected from the sample, the polarized light comprising a parallel polarized component and a perpendicular polarized component; determining, using a processor, speckle decorrelation rates for the parallel polarized component and the perpendicular polarized component; and estimating, using the processor, the average size of scattering particles in the sample based on the speckle decorrelation rates for the parallel polarized component and the perpendicular polarized component.

In another embodiment, the invention provides a method for determining a spatial map of a frequency-dependent modulus in a sample, including: obtaining, using a detector and at a plurality of time points, a plurality of speckle frames of the sample using parallel and perpendicular polarized light, each of the plurality of speckle frames comprising a plurality of pixels; determining, using a processor, speckle intensity autocorrelation curves for each of the plurality of pixels for each of the parallel and perpendicular light based on the plurality of speckle frames, estimating, using the processor, a distribution of scattering particle size in the sample based on the speckle intensity autocorrelation curves; determining, using the processor, a mean square displacement of local scattering particles based on the speckle intensity autocorrelation curves; and determining, using the processor and for each of the plurality of pixels, at least one of a frequency-dependent shear viscoelastic modulus $G(x,y,\omega)$, an elastic modulus $G'(x,y,\omega)$, or an viscous modulus $G''(x,y,\omega)$ for the sample based on the distribution of scattering particle size in the sample and the mean square displacement.

In yet another embodiment, the invention provides an apparatus for non-destructively estimating an average size of scattering particles in a sample, including: a coherent light source; a detector; and a processor in communication with the coherent light source and the detector, the processor being configured to: control the coherent light source to transmit linearly polarized light to the sample, control the detector to obtain polarized light reflected from the sample, the polarized light comprising a parallel polarized component and a perpendicular polarized component, determining speckle decorrelation rates for the parallel polarized component and the perpendicular polarized component, and estimate the average size of scattering particles in the sample based on the speckle decorrelation rates for the parallel polarized component and the perpendicular polarized component.

In still another embodiment, the invention provides an apparatus for determining a spatial map of a frequency-dependent modulus in a sample, including: a detector; and a processor in communication with the detector, the processor being configured to: control the detector to obtain, at a plurality of time points, a plurality of speckle frames of the sample using parallel and perpendicular polarized light, each of the plurality of speckle frames comprising a plurality of pixels, determine speckle intensity autocorrelation curves for each of the plurality of pixels for each of the parallel and perpendicular light based on the plurality of speckle frames, estimate a distribution of scattering particle size in the sample based on the speckle intensity autocorrelation curves, determine a mean square displacement of local scattering particles based on the speckle intensity autocorrelation curves, and determine, for each of the plurality of pixels, at least one of a frequency-dependent shear viscoelastic modulus $G(x,y,\omega)$, an elastic modulus $G'(x,y,\omega)$, or an viscous modulus $G''(x,y,\omega)$ for the sample based on the distribution of scattering particle size in the sample and the mean square displacement.

In yet another embodiment, the invention provides a method for determining a spatial map of particle sizes in a sample, including: obtaining, using a detector and at a plurality of time points, a plurality of speckle frames of the sample using parallel and perpendicular polarized light, each of the plurality of speckle frames including a plurality of pixels; determining, using a processor, speckle intensity autocorrelation curves for each of the plurality of pixels for each of the parallel and perpendicular light based on the plurality of speckle frames, estimating, using the processor, a distribution of scattering particle size in the sample based on the speckle intensity autocorrelation curves; determining, using the processor, a mean square displacement of local scattering particles based on the speckle intensity autocorrelation curves; and determining, using the processor and for each of the plurality of pixels, a spatial map of scattering particle size $a(x,y)$ for the sample based on the distribution of speckle intensity autocorrelation, decorrelation or relaxation times.

In another embodiment, the invention provides an apparatus for determining a spatial map of particle sizes in a sample, including: a detector; and a processor in communication with the detector, the processor being configured to: control the detector to obtain, at a plurality of time points, a plurality of speckle frames of the sample using parallel and perpendicular polarized light, each of the plurality of speckle frames including a plurality of pixels, determine speckle intensity autocorrelation curves for each of the plurality of pixels for each of the parallel and perpendicular light based on the plurality of speckle frames, estimate a distribution of scattering particle size in the sample based on the speckle intensity autocorrelation curves, determine a mean square displacement of local scattering particles based on the speckle intensity autocorrelation curves, and determine, for each of the plurality of pixels, a spatial map of scattering particle size a(x,y) for the sample based on the distribution of speckle intensity autocorrelation times.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 4 provides an overview of the analysis of LSM data for biological tissue showing speckle dynamics, sample mechanics, and particle size distribution.

FIGS. 7A and 7B show speckle intensity decorrelation curves and scattering particle sizes; FIG. 7A shows conceptual forms of the laser speckle intensity autocorrelation functions, for unpolarized as well as parallel and perpendicular polarized speckle frames; FIG. 7B shows that sizes of scattering particles may be estimated from the ratio of the log of $g_2(t)$ curves at perpendicular and parallel polarization states.

FIG. 7C shows procedures for obtaining the particle size distribution based on the different relaxation times of the $g_2(t)$ curves.

FIG. 10A shows the spatial map of the shear viscoelastic modulus, G, evaluated using the LSM for a normal fatty tissue at multiple frequencies.

FIG. 10B shows the spatial map of the shear viscoelastic modulus, G, evaluated using the LSM for a biological tissue at multiple frequencies.

DETAILED DESCRIPTION

Figure 1A:
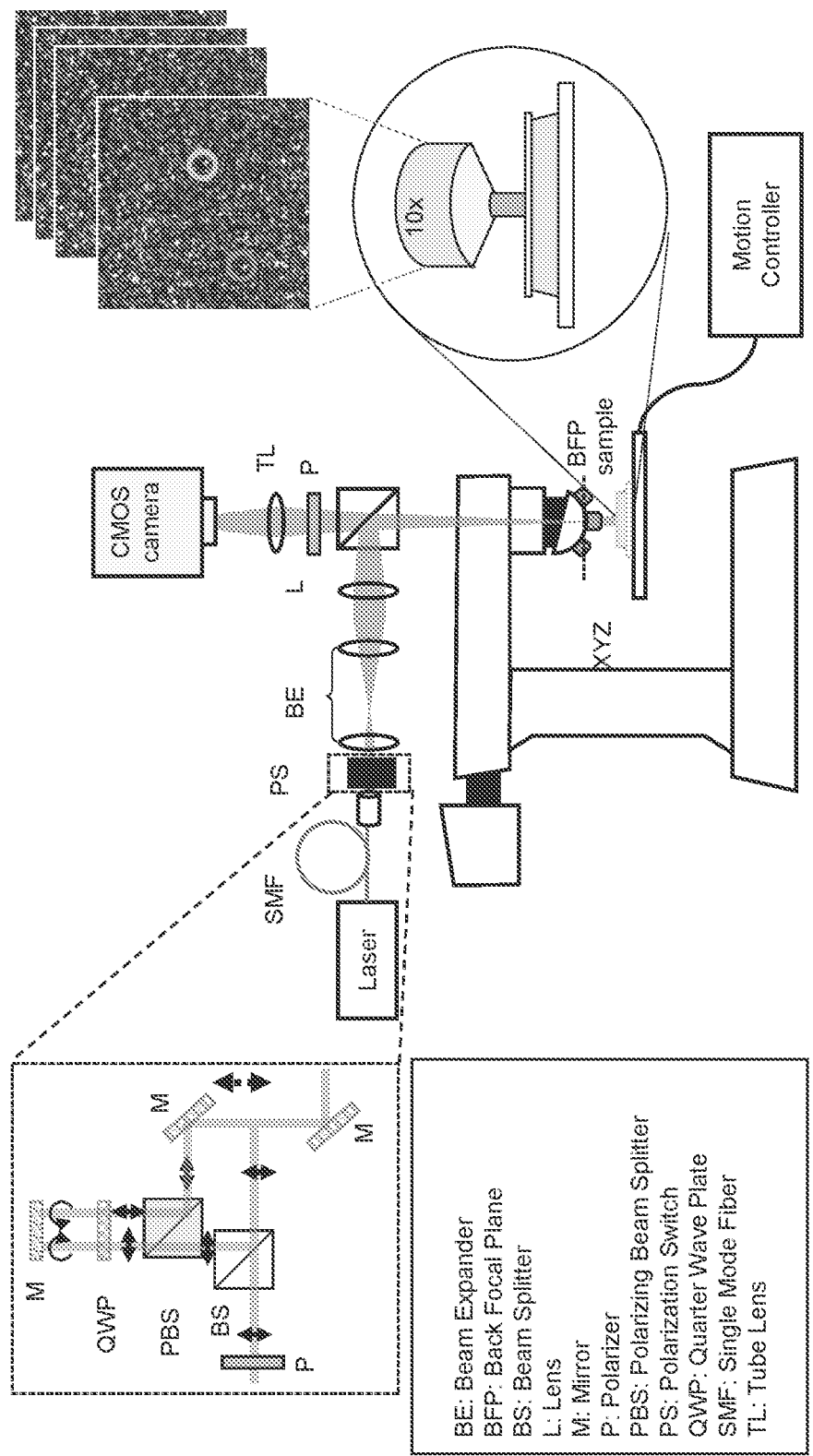
FIG. 1A provides a diagram of a system for laser speckle microrheology (LSM) that also includes measurement of spatially variant scattering particle sizes.

In accordance with some embodiments of the disclosed subject matter, mechanisms (which can include systems, methods, and apparatus) for non-destructively estimating an average size of scattering particles in a sample are provided.

The procedures of LSM have been developed, procedures which for the first time enable mapping the complex viscoelastic or shear modulus, G, in excised soft tissue with a spatial resolution of a few tens of µm, cm$^2$ scale FoV, within minutes. Using LSM imaging in a soft tissue samples, it is further demonstrated that G closely mirrors the histological presentation of the tissue. In addition, from the shear modulus, spatial maps of local heterogeneities and gradients may be calculated which have potential diagnostic implications. These heterogeneity indices may implicate the viscoelastic properties of tissue microenvironment in prognosis and likely pave the path for identifying new modifiable targets for treatment.

It is increasingly recognized that the pathogenesis and progression of a majority of human disease, are guided by the mechanical transformation of tissue microenvironment. In vitro models of benign and malignant cells demonstrate that the altered mechanical properties of the extra-cellular matrix (ECM) promote phenotype transformation, differentiation, growth, and migration of cells. These insights, however, are only established in the context of in vitro mechanobiology studies. However, little is known about the potential translational impact of these concepts, as pertains to the clinical course of human disease.

Laser speckle microrheology provides a research tool for investigating the link between the viscoelastic properties of the tissue microenvironment and its spatial variability with the clinical symptoms of disease onset and progression. Most of the existing techniques only provide the information about elastic properties of the tissue, at bulk scales. The LSM on the other hand, enables non-contact mapping of both viscous (liquid-like) and elastic (solid-like) behaviors under different loading rates, as best characterized by the frequency-dependent viscoelastic modulus also termed complex shear modulus, G($\omega$). This is significant because it turns out that the interplay between viscous and elastic traits may additionally modify the malignant behavior, in ways not explained by elasticity alone. Moreover, the spatial distribution of elastic and viscous traits additionally modulate the malignant progression, in ways not readily evident from bulk or ensemble averaged properties.

Accordingly, embodiments of the present disclosure provide improvements over previous work of the inventors including that of U.S. Pat. No. 10,359,361, entitled "Laser speckle micro-rheology in characterization of biomechanical properties of tissues," which is herein incorporated by reference in its entirety. In the current disclosure, the laser speckle microrheology (LSM) framework is detailed and validated for quantifying the spatially-variant, frequency-dependent viscoelastic behavior of biological tissues, with additional information on measuring spatially-variant optical properties and light scattering particle size distribution from time varying speckle patterns obtained at different polarization states. Laser speckle is a granular intensity pattern that arises when a turbid material such as biological tissue is illuminated by a coherent beam of light. Brownian distribution of scattering particles induces speckle intensity fluctuations. The speckle fluctuations are therefore modulated by the scales and extent of these thermal movements and in turn the viscoelastic properties of their surrounding environment. In addition to the viscoelastic parameter, the size of light scattering particles is an important factor that modulates the rate of speckle fluctuations.

Algorithms have previously been devised to estimate the average hydro-dynamic size of endogenous scattering particles in biofluids and colloids. The prior approach was based on measuring the hydrodynamic radius of scattering particles from the spatial reflectance profile by evaluating the temporally-averaged speckle intensity acquired at the parallel polarization state, with respect to the polarization state of the illumination beam. The resulting intensity pattern was used to measure the diffuse reflectance profile (DRP) in the parallel polarization state. The DRP in turn exhibited a unique spatial pattern that was related to average hydro-dynamic radius of scattering particles. More specifically, as the particles grow in size from 100 nm to 3 microns, DRP evolves from a bilobular pattern to an elliptical form and eventually to a quadrifolium or clover-like shape. Nevertheless, this approach was only applicable to biological fluids with larger scattering particles and did not present sufficient sensitivity for evaluating the scattering particle size in soft tissues where the unknown scattering particle size distribution is skewed towards significantly smaller particles. In addition, this approach was not suited for spatial mapping of the frequency-dependent shear viscoelastic modulus, G (x,y,$\omega$) (where $\omega$=2$\pi$f, [f]=Hz, [$\omega$]=rad/s), in heterogeneous tissue, where scattering particle size is spatially-variant and exhibits a different size distribution, for instance in the tumor epithelium vs. stroma. This is because for such heterogeneous tissue, the scattering particle size distribution across the tumor landscape needs to be known to permit spatial mapping of the shear modulus, G (x,y,$\omega$).

As discussed below, the current invention describes an alternative particle sizing approach, pertaining to the spatial mapping of the viscoelastic modulus, G, and the scattering particle size, a, in heterogeneous soft tissue. In addition, it entails methods for quantifying the heterogeneity of both a and G, and also for investigating the frequency-dependence of G with knowledge of spatially variant modulus and scattering particle sizes.

Thus, the present disclosure describes a particle sizing approach that is based on evaluating the speckle intensity autocorrelation function at two polarization states such as parallel and perpendicular with respect to the illumination state. Analysis of the time-dependent ratio of the log of the speckle intensity autocorrelation function at perpendicular and polarizations states is expected to yield the scattering particle size distribution.

A second aspect of the present disclosure is the capability to obtain a 3D G(x, y, $\omega$) and subsequently both the elastic and viscous moduli of G' and G" maps from tissue. This is made possible by knowing the spatial-dependence of scattering particle size, a.

A third aspect of the present disclosure is with regard to quantifying the heterogeneities in the modulus G(x, y, $\omega$), and particle size variations, a, both of which are known to have significant clinical implications, such as in the context of tumor-stroma interactions in the field of cancer biomechanics.

The optical opacity and turbidity of biological tissues stems from the refractive index mismatches between structural fibers and cell nuclei (n~1.4-1.45) and their background of cytoplasm (n~1.36) or extracellular fluid (n~1.34). These refractive index mismatches are the source of scattering signal and the optical properties of tissue. Refractive index variations may be either treated as a continuum of length scales or regarded as granular scattering particles of a given size distribution. The current invention takes the latter approach.

FIG. 1A provides a diagram of an embodiment of an LSM platform showing an LSM optical setup. Light from a continuous-wave (CW) laser is passed through a polarization switch. In this polarization switch, the light is vertically polarized. One embodiment of the polarization switch is shown in the inset. In this case, the polarized beam is split into two beams using a beam splitter (BS). One of the vertically polarized beams passes through polarizing beam splitter (PBS) to a quarter waveplate (QWP), transforming into circular polarization. The beam is then reflected off a mirror, which flips the circular polarization direction. The beam is then passed through the same QWP, returning to linear polarization, which is rotated 90°, creating a horizontally polarized beam. The PBS redirects the horizontally polarized beam into the alternate direction. A pair of piezo mirrors enable switching between the two polarized beams, such that either the vertical or horizontally polarized beam is incident on the sample at any given time. In an alternate embodiment, the polarization state may be modulated using a polarization modulator optionally in combination with an optical isolator or polarization isolator and switching mirrors to select light in one of two polarization states. The illumination beam is expanded, shaped and focused at the back focal plane of an objective lens, creating a collimated illumination beam of 8 mW power and 500 µm dia. at the sample site. Scattered light is collected back through the same objective and acquired, through a tube lens and a linear polarizer, by a high-speed CMOS camera. The linear stage is used to translate the sample with respect to the illumination beam.

Figure 1B:
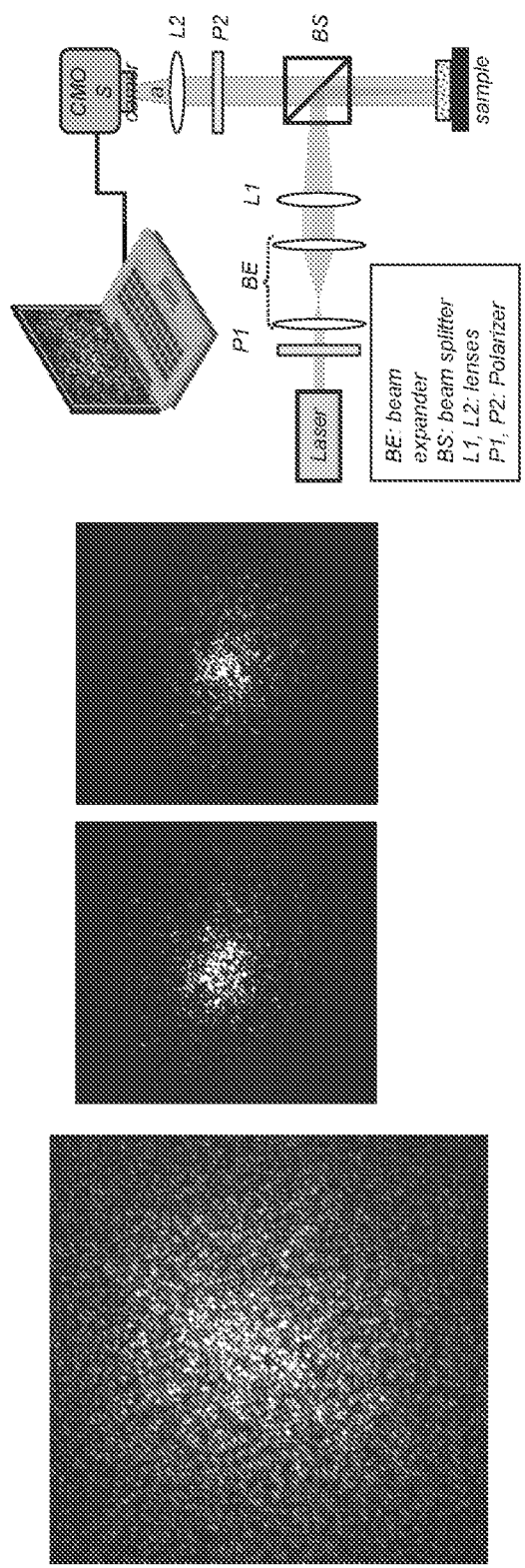
FIG. 1B provides an overview of LSM based on the phenomenon of laser speckle which is a granular intensity pattern that occurs when a medium is illuminated with laser light. Shown are samples of speckle images (left, center) and a system for obtaining speckle data (right) as well as diagrams of the samples associated with the speckle images (center).

LSM is microscopic embodiment of laser speckle rheology, built using an optical microscope platform to provide high resolution imaging capability (FIG. 1B). When a coherent beam of light illuminates a turbid specimen, such as tissue, the photons scatter from endogenous scattering particles and travel along different optical paths. The self-interference of scattered light at the CMOS sensor forms a grainy intensity pattern, termed speckle pattern. Thermal Brownian displacements of scattering particles, induce speckle fluctuations.

The rate of speckle fluctuation is related to the scale and the extent of Brownian particles displacements and in turn to the viscoelastic modulus of the surrounding micro-environment. This is a passive technology, in which thermally-modulated speckle fluctuations are processed to obtain the viscoelastic properties of tissue, without the need for an external force. In compliant tissue, particles execute rapid Brownian excursions in a loose meshwork, creating swift speckle intensity fluctuations. In rigid tissue, restricted particle displacements in a dense meshwork induce listless speckle spots.

Figure 2A:
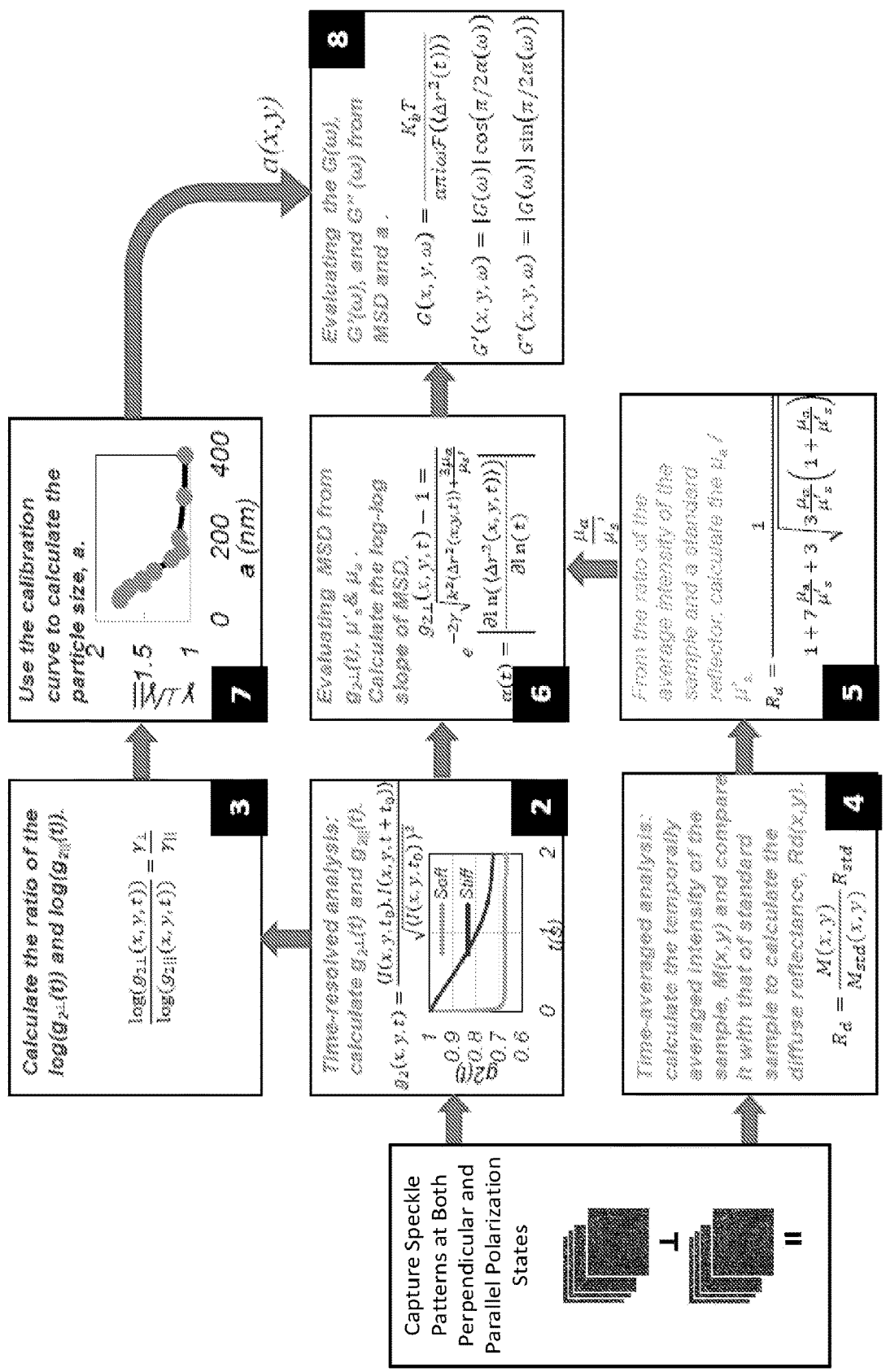
FIG. 2A shows a flow chart of an embodiment of an LSM processing algorithm.
Figure 2:
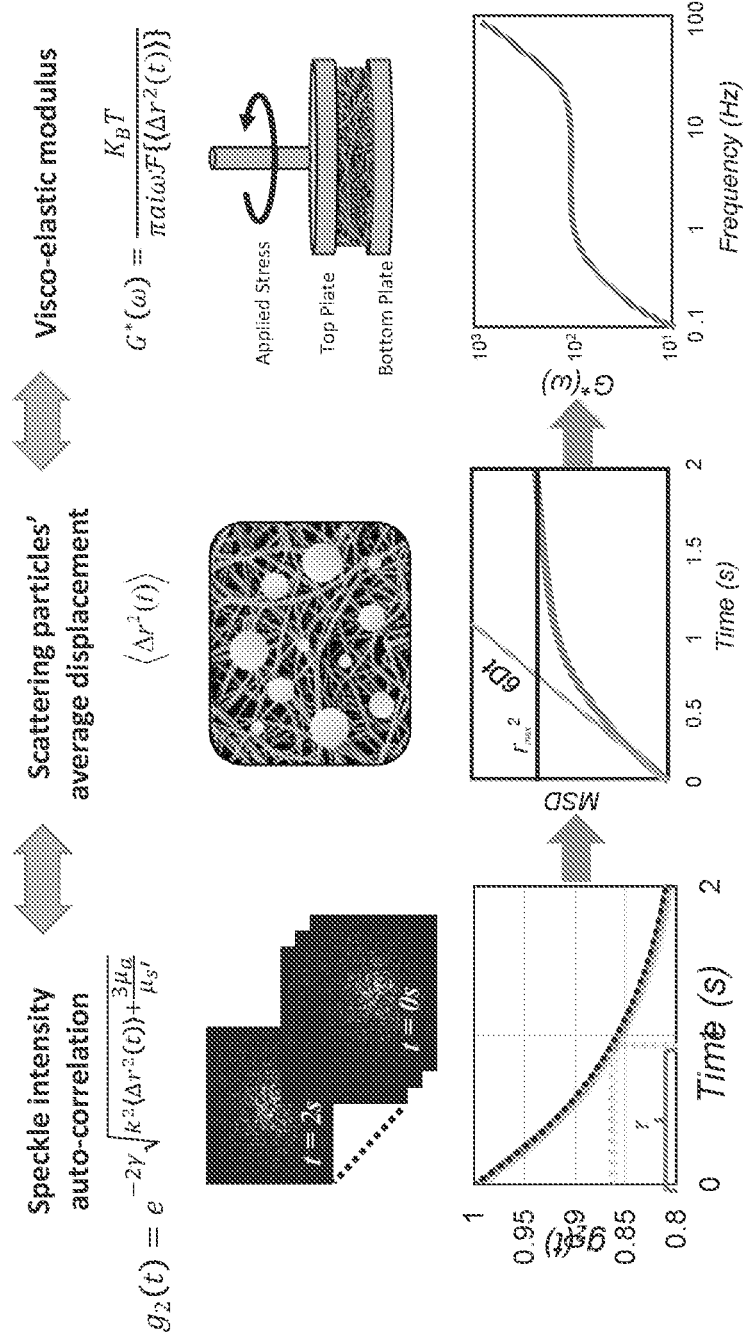
FIG. 2B provides an overview of the analysis of LSM data.

FIG. 2A shows a flow chart of an embodiment of an LSM processing algorithm. Speckle frames are acquired at both parallel and perpendicular polarization states (Box 1). Temporal cross-correlation of intensity variations within individual pixels of the frame returns the speckle intensity autocorrelation, $g_2(t)$, curves at both polarizations (Box 2). Calculating the ratio of the log of $g_2(t)$ curves at the two polarization states yields the ratio of the y coefficients (Box 3). Temporal averaging of the speckle frames yields the diffuse reflectance profile (DRP) (Box 4). Comparing the diffuse reflectance with that of a standard reflector yields the µa/µs' ratio (Box 5). The mean square displacement (MSD) of local scattering particles is deduced from the $g_2(t)$ curves (Box 6). The $y_\perp/y_\parallel$ is compared with the lookup table to yield the scattering particle size distribution (Box 7). Substituting the MSD in the Generalized Stokes-Einstein relation (GSER), yields the frequency-dependent shear viscoelastic modulus, $G(\omega)$, as well as the elastic and viscous moduli, G' and G".

Using this approach, spatial maps of the frequency-dependent modulus, $G(x,y,\omega)$ and particle size $a(x,y)$ can be measured to extract indices related to disease processes based on the heterogeneous properties of the sample.

Cross-correlation analysis of speckle frames yields the speckle intensity autocorrelation function, $g_2(t)$ (FIG. 2B). By fitting an exponential curve to $g_2(t)$ and calculating the speckle decorrelation time constant, T, the rate of speckle fluctuations is quantified. In compliant materials, extensive Brownian trajectories elicit rapidly fluctuating speckle patterns with short decorrelation times. On the other hand, in rigid substrates restricted particle excursions induce minute speckle modulations and longer decorrelation rates. To evaluate the actual viscoelastic modulus, the speckle fluctuations are related to the scattering particles' displacement. For purely viscous media, mean square displacement (MSD) grows linearly with time. More rigid elastic medium particles have restricted motion, and displacements around the center of equilibrium is constant. For complex fluids having viscoelastic behavior, MSD may take a more complicated shape. On the other hand, the extent and scale of particles' Brownian displacements, quantified by MSD, is determined by the rigidity and mechanics of the surrounding medium. In fact, the generalized stokes-Einstein equation may be used to derive the viscoelastic modulus. As a result, the same mechanical modulus can be obtained in a non-contact and non-destructive manner. The optical properties of tissue, including absorption coefficient, $\mu_a$, and the reduced scattering coefficient, $\mu_s'$, may influence the speckle intensity fluctuations. More specifically, while speckle decorrelation accelerates with increasing $\mu_s'$, it slows down with increasing $\mu_a$. Therefore, in order to extract the MSD of particles from the speckle fluctuations, one would need to estimate and compensate for the influence of optical properties. More specifically, the speckle intensity autocorrelation, $g_2(t)$, may be expressed as:

$$g_2(t) - 1 = e^{-2\gamma\sqrt{k^2\langle\Delta r^2(t)\rangle + \frac{3\mu_a}{\mu_s'}}}$$

Therefore, one would need to know the $$\frac{3\mu_a}{\mu_s'}$$

to extract the MSD from the g2(t). Once the MSD is obtained, it can be replaced in the Generalized Stokes Relation to yield the frequency-dependent shear viscoelastic modulus, as follows:

$$G(\omega) = \frac{K_b T}{a\pi i\omega \mathcal{F}(\langle\Delta r^2(t)\rangle)}$$

Here, F is Fourier transform and a is the scattering particle radius.

Therefore, one also needs to know or estimate a, which is the average sphere-equivalent radius of scattering particles to evaluate the $G(\omega)$, from MSD.

Figure 3:
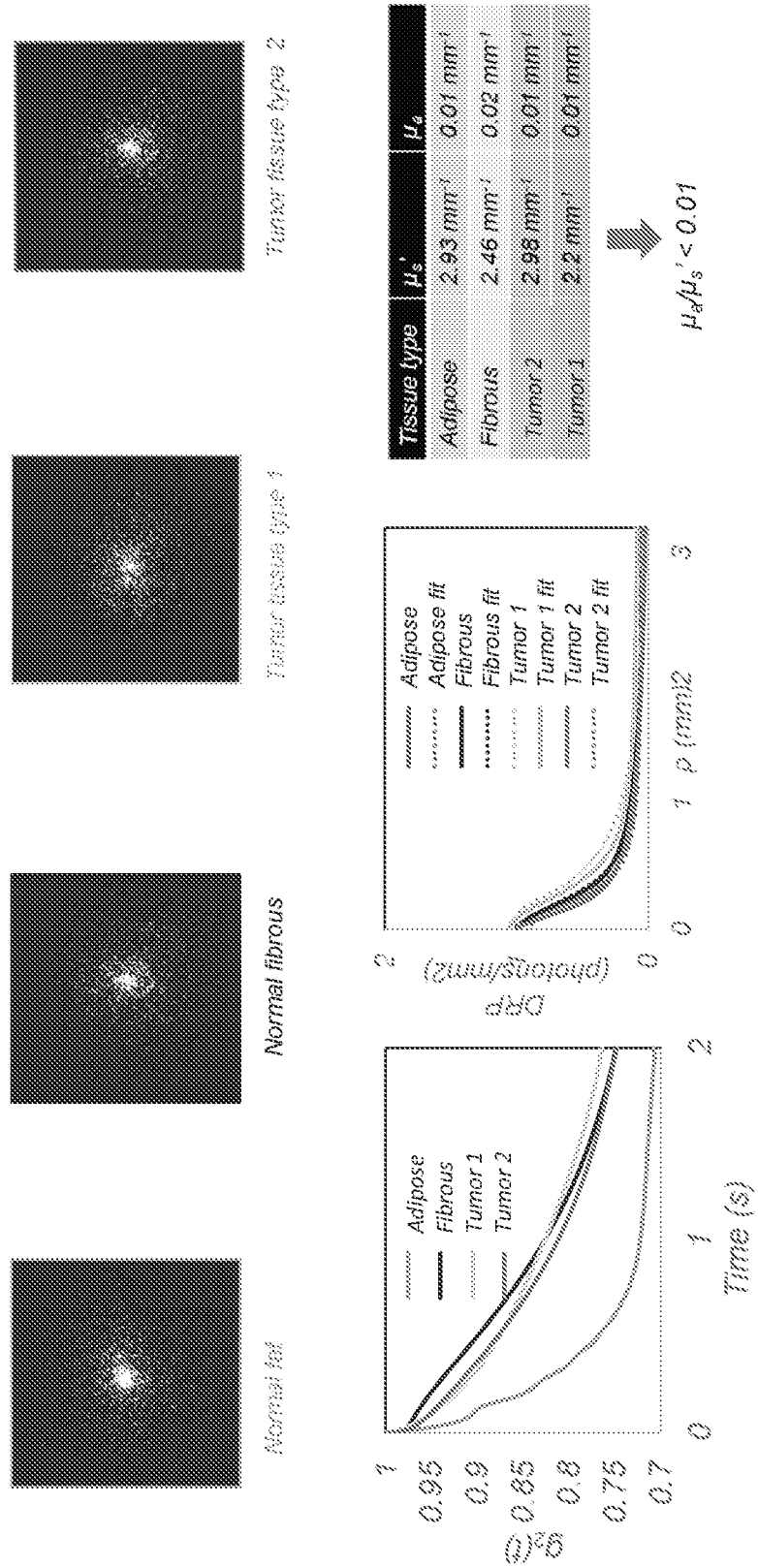
FIG. 3 provides an overview of the analysis of LSM data for biological tissue.

FIG. 3 displays the speckle frames series acquired by illuminating four tissue specimens, namely adipose, fibrous, and two types of tumor tissue. It has been shown that by averaging the speckle frames over time, one can obtain the diffuse reflectance profile (DRP) of tissue. The radial DRP is then obtained by calculating the average DRP over the points that are at the same distance from the illumination center. Next, a model function derived from diffusion theory may be fitted to the radial DRP to extract the $\mu_a$ and $\mu_s'$. For the soft tissue specimens in this slide, it turns out that the $$\frac{\mu_a}{\mu_s'}$$

is relatively small (<0.01), suggesting that for this given wavelength, as long as there are no microvasculature in the tissue, it is not critical to evaluate or correct for optical properties. Nevertheless, if the specimen includes microvasculature, this ratio may grow larger, due to absorption from blood. In that case, it is important to estimate and correct for optical properties.

The next step in evaluating the G(ω) from MSD is to estimate the average sphere-equivalent radius of scattering particles, a (FIG. 4). As discussed above, we have developed an approach to extract the a value from the azimuth angular profile of the DRP, when the speckle patterns are acquired in the parallel polarization state. In previous work it was suggested that as the particle size increases from 100 nm to 3 μm, the DRP evolves from a bilobular pattern (e.g. at a=0.1 μm and 0.5 μm in FIG. 4) to a cloverlike pattern (e.g. at a=1 μm, 2 μm, and 3 μm in FIG. 4). This is displayed on the right panel of the slide, which displays the speckle patterns remitted from assorted micro-spheres of known sizes. Therefore, by calculating the ratio DRP along the short and long axis, i.e. I(0°)/I(90°) one can estimate the scattering particle size. A lookup table has previously been developed which tabulates the a vs I(0°)/I(90°), as seen in the bottom of right panel. However, this prior work was only sensitive to scattering particle sizes in the 100 nm to 3 μm range.

The speckle patterns shown on the left in FIG. 4 are remitted from adipose, fibrous, and tumors. As can be seen, the patterns are quite similar to one another and are mostly bilobular (elliptical). This indicates that for majority of soft tissues, the particle size is comparable to 100 nm (0.1 μm), although it is difficult to pinpoint the exact particle size.

Figure 5:
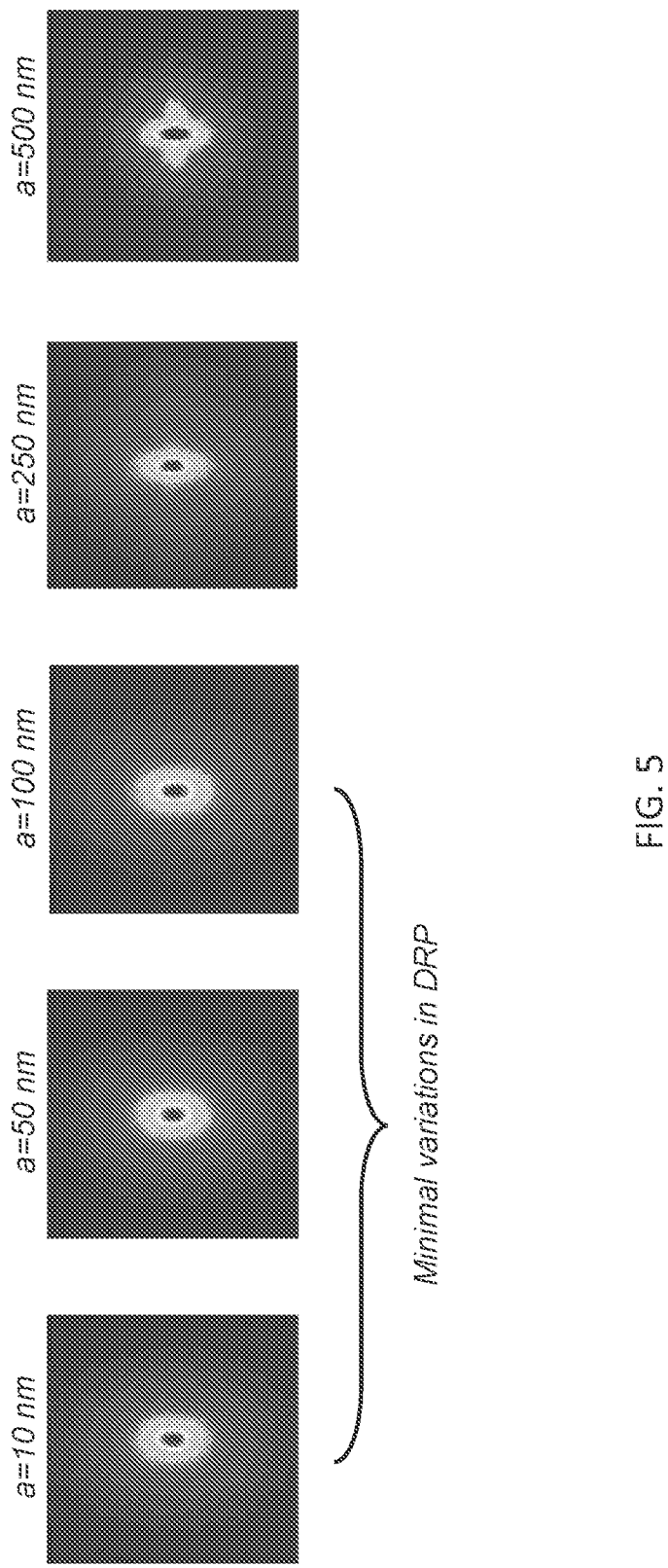
FIG. 5 shows a Monte Carlo simulation of co-polarized diffuse reflectance profiles (DRPs).

To better understand the source of this problem, polarized light Monte Carlo ray-tracing has been used to simulate the DRP pattern, remitted from the scattering materials of varying particle sizes (FIG. 5). It turns out that the DRP pattern does not change as the particle size decreases from 100 nm to 10 nm, suggesting that the previous techniques may have limited applicability to biological tissues, as such breast, which have small average particle size.

Thus, the presently-disclosed methods have been developed to overcome this issue. It was noted that the speckle patterns remitted from a sample at parallel and perpendicular states do not fluctuate at the same rate. In other words, the speckle fluctuations are slower in the parallel polarization state. This is because at this state, the number of single scattered light rays are larger compared to the perpendicular states. As the size of scattering particles is reduced, the scattering becomes more and more isotropic. As such, the number of single scattered rays that retain their initial polarization states increases. Moreover, the rays that scattered multiple times depolarize more rapidly. As a result, the rate of speckle decorrelation at parallel and perpendicular polarizations states varies significantly when particle size is reduced.

Figure 6:
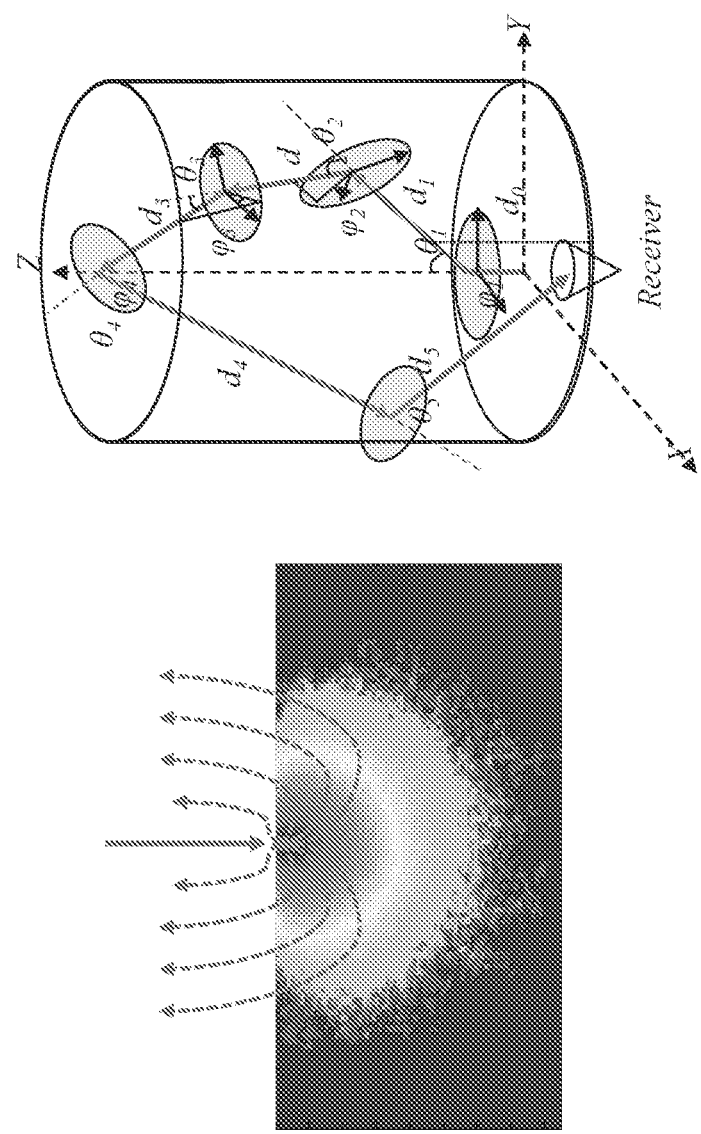
FIG. 6 shows a schematic diagram of a Monte Carlo Ray Tracing algorithm, where the left panel shows movement of light into and through a tissue and the right panel shows a diagram of the path of a single photon traveling through the tissue and impinging on a receiver.

The input to the polarization-sensitive correlation transfer Monte Carlo ray tracing (CT-MCRT) algorithm (see FIG. 6) includes the refractive indices of the particles and the surrounding medium, the particle radius, and the concentration of particles. The pencil beam of light, exhibiting a linear polarization state created for instance using a linear polarizer filter illuminating the sample, was simulated by $10^6$ photons.

The incident light may be for example horizontally polarized (linear polarization) with the Stokes vector S0=[1 1 0 0], or for example vertically polarized (linear polarization) with the Stokes vector S0=[1 -1 0 0]. Upon the photon-particle interactions, the Stokes vector, S, was updated via multiplication with the Mueller matrix. In addition the momentum transfer was calculated as: $q=2k_0 \sin(\theta/2)$. For photons returning to the imaging plane of the detector (e.g. camera), the irradiance of light retaining the initial polarization state was calculated using the scalar multiplication of S with S0. In addition, the Cumulative momentum transfer $Y=\Sigma q^2/(2k_0^2)$ of each photon was calculated. Subsequently, the speckle intensity autocorrelation was calculated as:

$$g_2^{MCRT}(t) - 1 = \left( \int_0^\infty P(Y) e^{-\frac{1}{3}k^2 \langle \Delta r^2(t) \rangle Y} \right)^2 = \left( \sum_{i=1}^n W_i e^{-\frac{1}{3}k^2 \langle \Delta r^2(t) \rangle Y_i} \right)^2$$

Here, $W_i$ refers to the scalar product of the Stokes vector of the photon with the Stokes vector corresponding to detection polarization. That is, the component of photon intensity that is aligned with the polarization state of the detection polarization state. Using this simulation model, the g2(t) curves corresponding to parallel and perpendicular states were simulated and the ratio of their log was calculated, as shown below (see FIG. 7A). For each scattering particle size, the ratio of $\log(g_2(t))$ in parallel and perpendicular polarization states was then calculated as:

$$\frac{\log(g_{2\perp}(t))}{\log(g_{2\parallel}(t))} = \frac{\gamma_\perp}{\gamma_\parallel}$$

This yields a lookup table that enables the retrieval of the average particle size from the rate of speckle fluctuations at the two polarization states as seen in FIG. 7B, where such values are graphed.

The $$\frac{\gamma_\perp}{\gamma_\parallel}$$

ratio is a function of time. It is hypothesized that this ratio is largest at early times, when the contribution of shorter paths is dominant. On the other hand, it will decay at longer times where the contributions from longer paths increases. Therefore, it is likely possible to obtain the particle size distribution by analyzing the ratio as a function of the lag time.

FIG. 7C shows procedures for obtaining the particle size distribution based on the different relaxation times of the g2(t) curves. The g2(t) curve elicited from a poly-dispersed sample exhibits multiple relaxation times corresponding to the size distribution of the scattering particles. Shorter optical paths correspond to small particles and induce the early decorrelation of the g2(t) curves, while longer paths frequently correspond to larger, forwardly directing scattering centers.

To evaluate the average a, g2(t) curves are obtained by both ensemble averaging of speckle autocorrelation of all the speckle spots within the frame and by temporally averaging multiple curves evolving in time (FIG. 7A). To obtain the particle size distribution, several other approaches may be possible based on spatio-temporal processing of the speckle frame series and modifying the illumination and collection geometries, as well as the illumination wavelength as detailed herein.

Figure 7D:
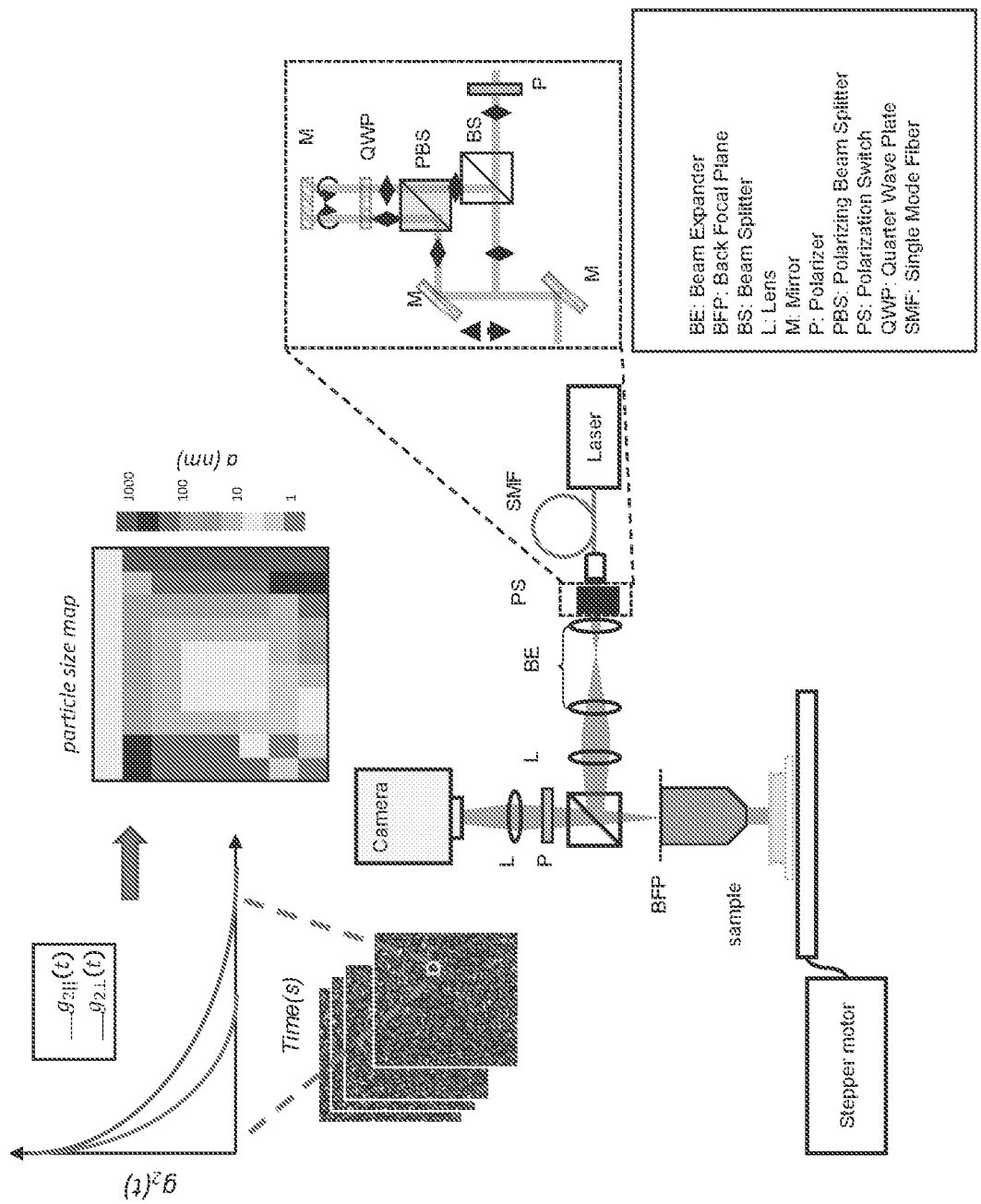
FIG. 7D shows procedures for obtaining the particle size distribution based on the spatial mapping of the decorrelation ratio.

FIG. 7D shows procedures for obtaining the particle size distribution based on the spatial mapping of the decorrelation ratio. Spatio-temporal analysis of speckle fluctuations yields a 2D map of g2(t) curves for individual pixels within the frame. Using a collimated beam, illumination and acquiring speckle frame series through an objective lens enables spatial mappings of the speckle dynamics. As such, by mapping the $$\frac{\gamma_\perp}{\gamma_\parallel}$$

across the sample, a spatial map of the scattering particle size may be evaluated. The spatio-temporal analysis may be further combined to obtain a more detailed map of particle size distributions across the sample.

The spatio-temporal variations of $$\frac{\gamma_\perp}{\gamma_\parallel}$$

may be interpreted in many different ways, with the spatial variations elucidating the transverse variations in particle size and the temporal variations attributed to the longer paths emerging from deeper sections to obtain a volumetric map of the scattering particle size. In addition, the illumination and collection polarization states may be varied from being linear to circular and elliptical to eliminate and mitigate the specular reflection.

Figure 7E:
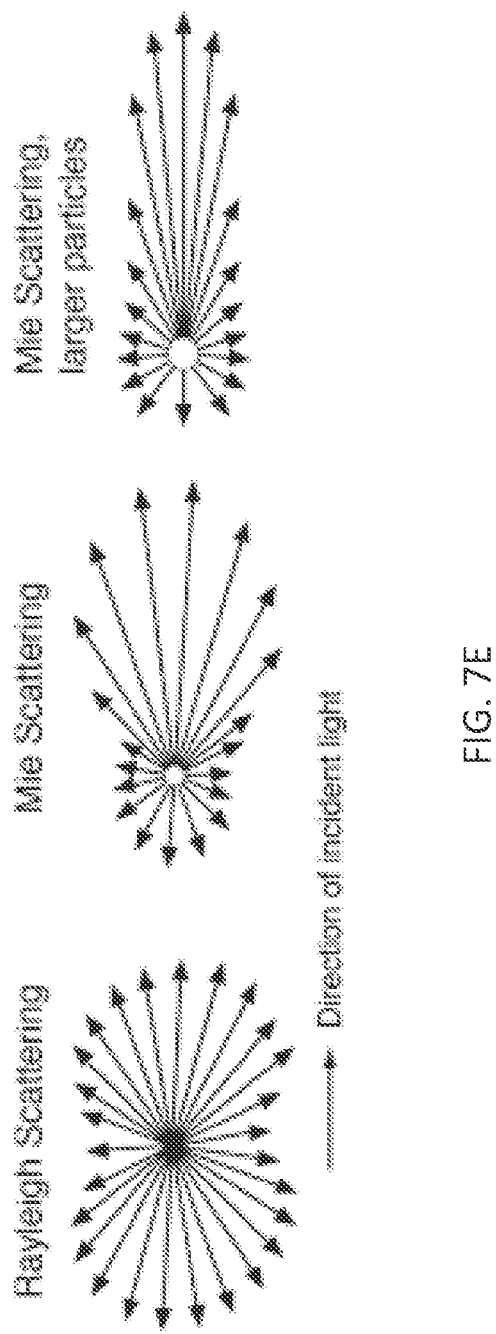
FIG. 7E shows procedures for extending the size range by exploiting hyperspectral speckle acquisition.

FIG. 7E shows procedures for extending the size range by exploiting hyperspectral speckle acquisition. The relationship between $$\frac{\gamma_\perp}{\gamma_\parallel}$$

and the scattering particle size is dependent upon the illumination wavelength. This is because the scattering phase function of the particles depends on the $a/\lambda$ ratio:

If $a/\lambda$ is small, the scattering is isotropic and the $$\frac{\gamma_\perp}{\gamma_\parallel}$$

is large.

If $a/\lambda$ is large, the scattering is forwardly directed and the $$\frac{\gamma_\perp}{\gamma_\parallel}$$

is small.

By incorporating multiple illumination wavelengths, a wider range of a values may be probed from a few nm to nearly 1 μm. For particles larger than 1 μm, this approach may be combined with previous approaches based on the analysis of the co-polarized diffuse reflectance. In one embodiment the illumination wavelength may include 633 nm light and in various other embodiments the illumination wavelength may include light ranging from 400 nm-1400 nm. Provided that the tissue is not highly absorbing at a particular wavelength, that particular wavelength may be included in the range of illumination wavelengths.

Figure 8:
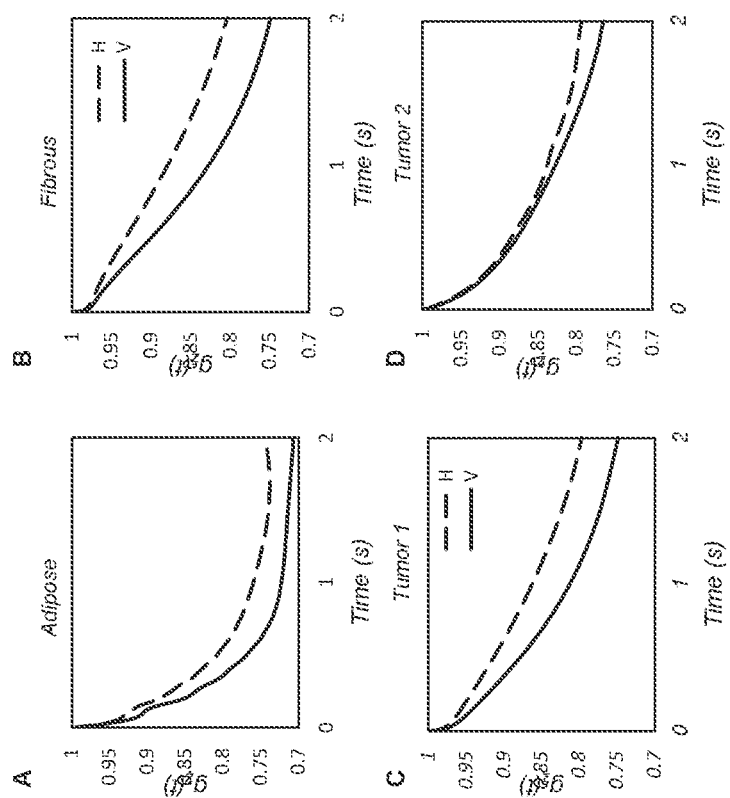
FIG. 8 shows sample experimental $g_2(t)$ curves, at parallel and perpendicular polarization states for various examples of biological tissues; panel (A) adipose, $y_\perp/y_\parallel=1.32$, a=120 nm; panel (B) fibrous, $y_\perp/y_\parallel=1.5$, a=100 nm; panel (C) tumor tissue type 1, $y_\perp/y_\parallel=1.43$, a=110 nm; and panel (D) tumor tissue type 2 (ILC), $y_\perp/y_\parallel=1.24$, a=130 nm. These curves indicate that the scattering particle size of breast tissue is on the order of 100 nm; in these figures 'H' refers to horizontal or parallel light and 'V' refers to vertical or perpendicular light.

The accuracy of the MCRT simulations is verified by comparing the ratio of the logs with the experimentally derived values reported in the literature. This curve was used to estimate the average scattering particle size of benign and malignant tissues. FIG. 8 panels A-D display the experimentally evaluated $g_{2\perp}(t)$ and $g_{2\parallel}(t)$ curves for normal adipose and fibrous, as well as tumor tissues. Experimentally derived $y_\perp/y_\parallel$ yield the following values for the samples displayed in this figure. These values are consistent with the prior studies on calculating the scattering particle size distribution by scanning electron microscopy (SEM).

Frequency Dependence of G: the LSM technology enables evaluating the frequency-dependent complex shear viscoelastic modulus, i.e. $G(\omega)=G'(\omega)+iG''(\omega)$, across a range of frequencies and in a single acquisition. The range of accessible frequencies spans multiple decades and is virtually unlimited. In practice, the frequency range is determined by the acquisition frame rate and duration. In contrast, mechanical testing devices need to evaluate the stress to strain ratio at each frequency, one at a time, to yield the $G(\omega)$ over a limited frequency range of 0.1-10 Hz, at discrete time points, of for instance 10-20 points per decade. In contrast, the frequency range accessible to LSM extends beyond multiple kHz directly dependent on the speckle image acquisition rate of the detector or camera. In addition, LSM is also able to text use deduce both the viscous and elastic components of the complex modulus.

To evaluate the $G(\omega)$, the Mean Square Displacement (MSD), $\langle \Delta r^2(t) \rangle$, of scattering particles is deduced from the speckle intensity fluctuations. The MSD is then replaced in the Generalized Stokes-Einstein equation to extract the complex shear modulus, as a function of oscillation frequency ($\omega=2\Pi f$) as follows:

$$G(\omega) = \frac{K_b T}{a\pi i \omega \mathcal{F}(\langle \Delta r^2(t) \rangle)}$$

Here, $\mathcal{F}$ is Fourier transform and a is the scattering particle radius. Due to the discrete and finite nature of the data points, and to avoid numerical errors at frequency limits, an algebraic approximation of Fourier transform is frequently used to calculate the $\mathcal{F}(\langle \Delta r^2(t) \rangle)$. This is achieved by fitting the MSD to a power-law form, i.e. $\langle \Delta r^2(t) \rangle \propto t^{\alpha(t)}$, where $$\alpha(t) = \left| \frac{\partial \ln(\langle \Delta r^2(t) \rangle)}{\partial \ln(t)} \right|,$$

is the log-log slope of MSD. This enables rewriting the $i\omega \mathcal{F}(\langle \Delta r^2(t) \rangle)$ as $$i\omega \mathcal{F}(t^\alpha) = i\omega \int_0^\infty e^{-i\omega t} t^\alpha dt = \Gamma(1+\alpha)\omega^{-\alpha} e^{-j\alpha(\omega)\frac{\pi}{2}} =$$

$$e^{-j\alpha\frac{\pi}{2}} = e^{-j\alpha\frac{\pi}{2}} \Gamma(\alpha+1) t^\alpha \big|_{t=1/\omega} = e^{-j\alpha\frac{\pi}{2}} \Gamma(\alpha+1) \langle \Delta r^2(t) \rangle \big|_{t=1/\omega}.$$

The following values were used in this derivation:

$$\Gamma(\alpha) = \int_0^\infty e^{-t} t^{(\alpha-1)} dt$$

$$t^\alpha u(t) \overset{\mathcal{F}}{\Leftrightarrow} \Gamma(\alpha+1)\omega^{-(\alpha+1)} e^{-j\frac{\pi}{2}(\alpha+1)}$$

Subsequently, the complex $G(\omega)$ may be expressed as:

$$G(\omega) = \frac{K_b T}{\pi a \Gamma(1+\alpha(\omega))\Delta r^2(\omega)}\Big|_{\omega=1/t}\left(\cos(\pi\alpha(\omega)/2) + i\sin(\pi\alpha(\omega)/2)\right)$$

Therefore, once the G is evaluated through the GSER, both the elastic (storage) and viscous (loss) moduli, i.e. the real and imaginary parts of the modulus, may be simply calculated as:

$$G'(\omega) = |G(\omega)|\cos(\pi/2 a(\omega))$$

$$G''(\omega) = |G(\omega)|\sin(\pi/2 a(\omega))$$

Figure 9A:
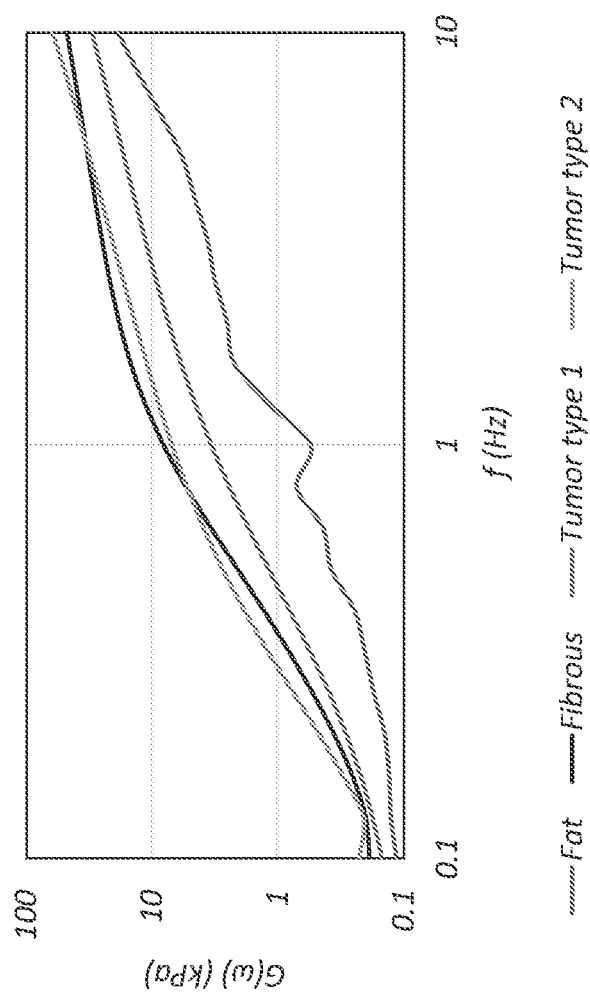
FIG. 9A shows frequency-dependent shear viscoelastic modulus, G, evaluated using the LSM for various biological tissues in panel: adipose or fat, typical fibrous tissue, tumor tissue type 1 and tumor tissue type 2.
Figure 9B:
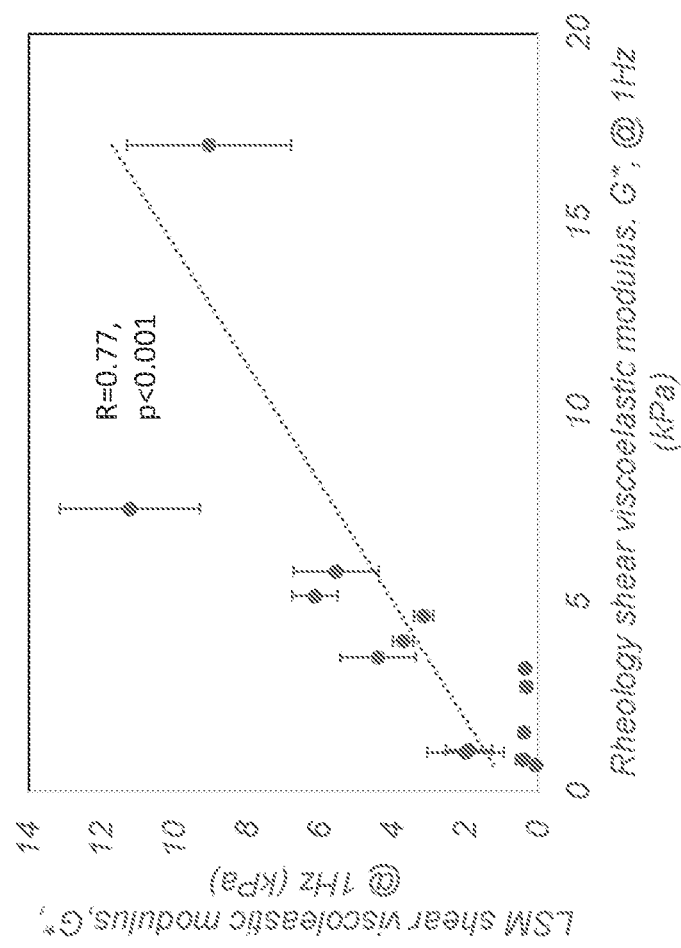
FIG. 9B provides a comparison of the disclosed procedures to conventional rheology.

FIG. 9A shows frequency-dependent shear viscoelastic modulus, G, evaluated using the LSM for various biological tissues in panel: adipose or fat, typical fibrous tissue, tumor tissue type 1 and tumor tissue type 2. FIG. 9B provides a comparison of the disclosed procedures to conventional rheology. FIG. 10A shows the spatial map of the shear viscoelastic modulus, G, evaluated using the LSM for a normal fatty tissue at multiple frequencies. FIG. 10B shows the spatial map of the shear viscoelastic modulus, G, evaluated using the LSM for a biological tissue at multiple frequencies.

Evaluating Tissue heterogeneity in the viscoelastic parameter G and scattering size parameter, a: The analysis methods disclosed below demonstrate the capability to extract and quantify tissue heterogeneity in mechanical properties given by the viscoelastic parameter defined by G or G* (also termed viscoelastic modulus or stiffness parameter). Comparable methods are used to similarly quantify heterogeneity in scattering particle size a to estimate indices related to but not limited to average, entropy, dispersion, and fractal dimension, as detailed below. Similarly, heterogeneity metrics may be derived separately for the elastic and viscous parameters, G' and G", respectively (also termed elastic modulus, viscous modulus, stiffness, or viscosity).

Figure 11:
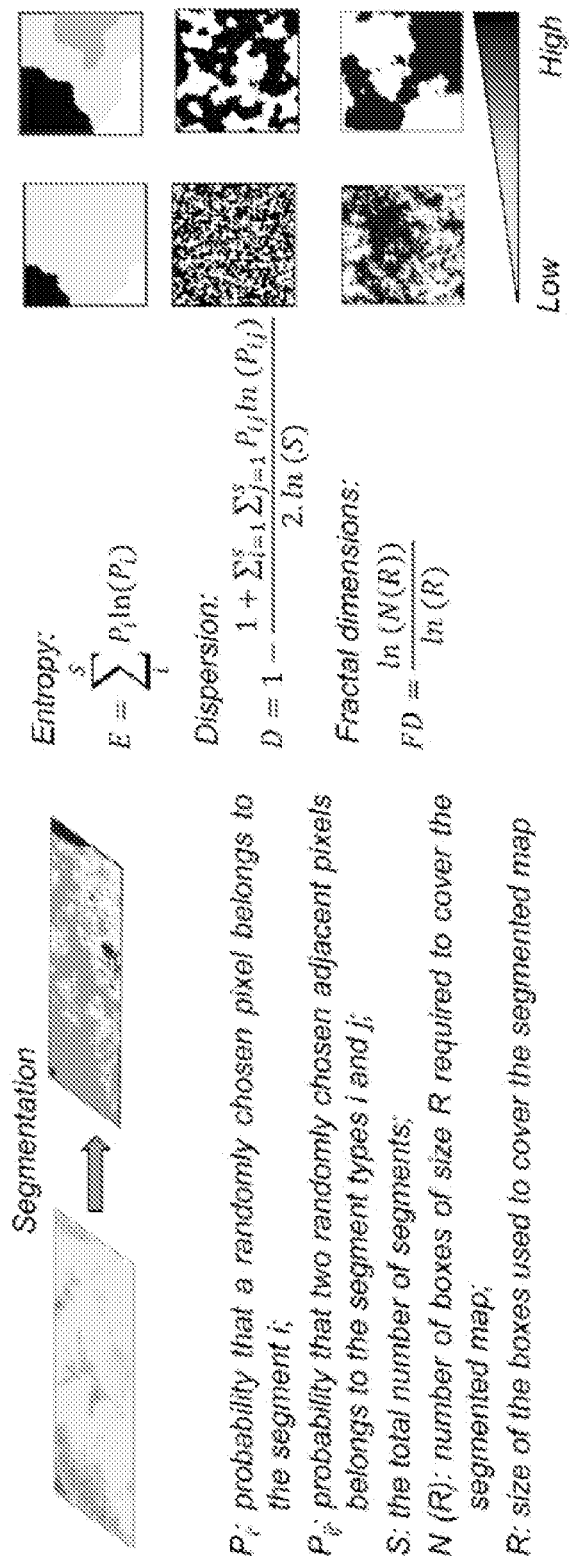
FIG. 11 shows a pictorial representation of several indices of heterogeneity, such as for instance, Entropy, Dispersion, and Fractal Dimensions.
Figure 12:
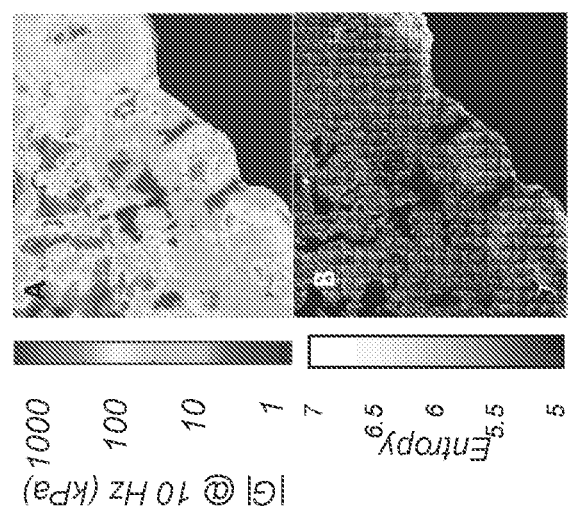
FIG. 12 shows results of calculating the local entropy across the biological tissue landscape; panel (A) shows the map of shear modulus magnitude at f=1 Hz, and panel (B) shows a spatial map of entropy. A higher entropy may be expected in malignant tissues compared to benign specimens.

Evaluating Micromechanical features: Several micromechanical indices may be extracted from the $G(x,y,\omega)$ evaluated by LSM. These include: the average value of the viscoelastic parameter of the biological tissue, $G^*_{ave}$, the maximum modulus value $G^*_{max}$, and the standard deviation of modulus distribution within the tumor $\sigma^*_G$. In addition, multiple indices of modulus heterogeneity are evaluated as described below and illustrated pictorially below. In short, Otsu's method (MATLAB image processing toolbox) is used to segment the G* maps to regions of different compliance in the 200 Pa-40 kPa range. Subsequently, the following heterogeneity indices are calculated (see FIG. 11):

Entropy ($E_G$): corresponds to the average randomness of the G values at individual pixels and reflects the overall modulus heterogeneity (see FIG. 12).

Dispersion ($D_G$): low value indicates a tissue microenvironment with a clumped pattern of modulus across and a high value indicates an tissue substrate with a dispersed pattern of modulus variability.

Fractal Dimension ($FD_G$): is a statistical index of complexity comparing how details in the shear modulus of the tissue microenvironment changes with the scale at which it is measured. FD is often calculated using the box counting algorithm, by counting the number of boxes of different sizes required to cover the evaluated pattern and calculating the log-log slope of the curve depicting the number of boxes versus their size.

Heterogeneity: The spatial profile of the shear modulus may be processed to yield the following: the average modulus, $\overline{G}$, modulus gradient or slope as well as the modulus heterogeneity indices. The $\overline{G}$ parameter is similar to the metrics evaluated by existing clinical techniques. On the other hand, the modulus gradient or slope and heterogeneity indices are uniquely accessible by LSM and highlight the strength of this novel platform in evaluating additional metrics of intra-tumoral mechanical heterogeneities. For example the steepness of the modulus gradient is an example of heterogeneity metrics. Additional examples of the numerous possibilities afforded by the LSM in probing and interpreting the micro-mechanical heterogeneities include:

Information entropy, E: The G maps will be quantized, by discretizing the G values in the 0-30 kPa to 256 intensity levels. The entropy of the resulting 8 bit gray-scale images are calculated.

Aside from evaluating the G for the entire tissue fragment, LSM enables distinguishing the G values within different histological compartments of the tissue such as various populations of cells, including native stromal, immune, epithelial, mitotic, as well as different types of ECM fibers, such as collagen and elastin, regions in a selected number of specimens. The G maps may then be segmented and the $\overline{G}$ corresponding to either of these components, i.e. $\overline{G}_{cells}$, $\overline{G}_{ECM}$ are computed. This enables investigating the differences between micromechanical properties of various tissue components.

The modulus slope and/or gradient: The role of modulus gradients and its steepness in directing the migration and local invasion has been demonstrated in vitro by using meticulously engineered gels of tunable elasticities and tracking the migratory behavior of seeded cells. Through evaluating and characterizing this quantity in clinical specimens, LSM makes this mechanobiology concept tangible and accessible. The spatial slope of modulus may be reported in kPa/mm units. This metric is in itself a measure of spatial mechanical heterogeneity of the tumor microenvironment, particularly at the intersection of various tissue compartments. Such interfaces and intersections may be traced in a semi-automatic and blinded/agnostic approach with respect to the spatial distribution of the shear modulus, through color space analysis of the co-registered histology slides to separate out different hues induced by various stains, which correspond to cellular and non-cellular components. The curve outlining the intersections may then be mapped to the spatial profiles of the G, as well as its heterogeneity indices, such as for instance the spatial slope, entropy, dispersion, etc. values at piece-wise linear segments along the intersection.

Figure 13:
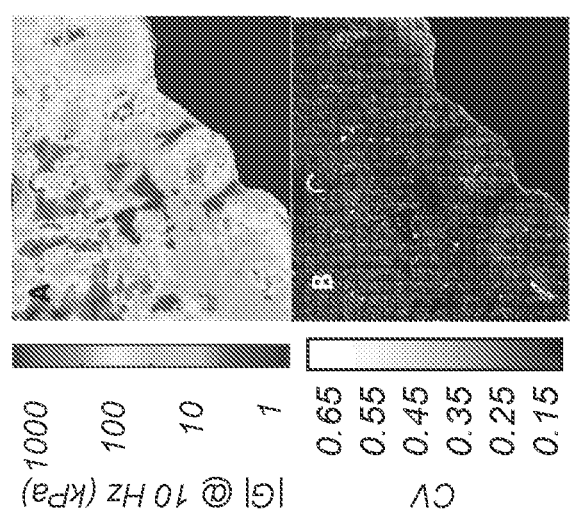
FIG. 13 shows results of calculating the heterogeneity indices across the biological tissue landscape; panel (A) shows the map of shear modulus magnitude at f=1 Hz, for a biological tissue, panel (B) shows the displays the local coefficient of variation (CV). It is observed that CV may be maximized at the sites of increased tissue heterogeneity.

The coefficient of variation: Another metric of heterogeneity may be obtained by evaluating the local coefficient of variation of G, i.e.

$$\frac{\sigma_G}{\mu_G},$$

where $\mu_G$ and $\sigma_G$ are the local mean and the standard deviation of the G. FIG. 13 depicts the G map of a biological tissue. The corresponding H&E, and the local coefficient of variation (CV) map are also displayed.

The above heterogeneity metrics may also be determined for maps of scattering particle size (a) independent of the mechanical properties:

Information entropy, E: The a maps will be quantized, by discretizing the a values in the 1-1000 nm range to 256 intensity levels. The entropy of the resulting 8 bit gray-scale images are calculated.

Aside from evaluating the average particle size for the entire tissue fragment, LSM enables distinguishing the a values within different histological compartments of the tissue such as various populations of cells, including native stromal, immune, epithelial, mitotic, as well as different types of ECM fibers, such as collagen and elastin, regions in a selected number of specimens. The maps of particle size a may then be segmented and the average particle size corresponding to either of these components, i.e. of either cells or ECM, are computed. This enables investigating the differences between particle sizes of various tissue components.

The particle size slope and/or gradient: Through evaluating and characterizing this quantity in clinical specimens, spatially-variant particle size maps may provide new insights on disease initiation and progression. The spatial slope of particle size is recorded may be reported in nm/mm or arbitrary units. This metric is in itself a measure of spatial heterogeneity of the tumor microenvironment, particularly at the intersection of various tissue compartments. Such interfaces and intersections may be traced in a semi-automatic and blinded/agnostic approach with respect to the spatial distribution of the particle size, through color space analysis of the co-registered histology slides to separate out different hues induced by various stains, which correspond to cellular and non-cellular components. The curve outlining the intersections may then be mapped to the spatial profiles of the a values, as well as its heterogeneity indices, such as for instance the spatial slope, entropy, dispersion, etc. values at piece-wise linear segments along the intersection.

The coefficient of variation: Another metric of heterogeneity may be obtained by evaluating the local coefficient of variation of a, i.e.

$$\frac{\sigma_a}{\mu_a},$$

where $\mu_a$ and $\sigma_a$ are the local mean and the standard deviation of the a value.

Accordingly, disclosed herein are methods and systems for carrying out a novel optical approach for estimating the average size of scattering particles. This approach is a non-invasive, non-contact, all-optical technique that enables estimating both the average size of scattering particles and their size distribution, without manipulating the tissues and biomaterials in their native state. It is potentially applicable for a variety of life science, biotechnology, and clinical medicine applications, for instance for sizing of proteins, antibodies, and biomarkers, as well as diagnosis of a variety of human diseases based on cytological analysis of tissue. One example application is identifying cancerous tissue and distinguishing it from benign lesions based on the overall change in the size distribution of normal and malignant cells as well as their nuclei and organelles.

The disclosed procedures are based on evaluating the laser speckle intensity fluctuations at perpendicular and parallel polarization states to infer the size of scattering particles. Speckle is a granular intensity pattern that forms when a coherent laser beam is backscattered from scattering media, such as in tissue. Speckle fluctuations are intimately related to the Brownian displacements of scattering particles, and hence to the viscoelastic properties of the surrounding tissue microenvironment. In addition, speckle fluctuations are also related to the size of scattering particles. For a medium of a given viscoelastic susceptibility, the speckle patterns' fluctuation rate decreases with the increase in the scattering particle size. Moreover, speckle fluctuation rates are also dependent on the polarization state of collected light, with respect to the polarization state of the illumination beam. More specifically, if the sample is illuminated by a linearly polarized laser beam, the parallel-polarized component of the back-scattered speckle often exhibits slower fluctuations compared to the perpendicularly polarized component.

A polarized correlation transfer Monte Carlo ray tracing algorithm has been developed to simulate this phenomenon. Results of the simulations indicate that the difference in the speckle decorrelation rates at parallel and perpendicular polarization states reflects the size of scattering particles. Without being limited by theory, this observation may be intuitively explained by noting that the parallel polarized component of the back-scattered light often entails shorter optical paths that have scattered only once. The number of these short optical trajectories increases as the scattering particles become smaller. This is because smaller particles scatter the light in a more isotropic pattern. On the other hand, as the particle size increases, the scattering becomes more and more forwardly directed, reducing the probability of a single-scattered photon to return back towards the detector. As such, for specimens with smaller particles, the parallel polarized component of the speckle fluctuates entails a larger number of short, slowly decorrelating optical paths. Using these concepts, the speckle intensity autocorrelation curves, $g_2(t)$ have been simulated at parallel and perpendicular states for media of different scattering particle sizes. For each scattering particles size, the ratio of $\log(g_2(t))$ was then calculated in parallel and perpendicular polarizations states. This yields a lookup table that enables one to retrieve the average particle size from the rate of speckle fluctuations at the two polarization states.

This approach is an extension to our prior work, which exploited the static diffuse reflectance profile of the backscattered light at the parallel polarization state to estimate the scattering particles size. While the former approach enables accurate particle sizing in the 100 nm-3 µm range, the new technique enables extending this range to particles as small as 10 nm.

Embodiments of the current invention provide apparatus and algorithms for accurate sizing of particles within tissues and biomaterials. In various embodiments, one or more of the following may be included in the optical apparatus used to acquire the backscattered signal:

1—A coherent light source, such as laser, of at least one wavelength.

2—A linear or circular polarizer to enable polarized or random sample illumination.

3—An optical fiber coupler and a single mode fiber to enable single mode illumination of the sample.

4—A beam expander and a lens to enable focused or collimated beam illumination of the sample.

5—A beam splitter to allow for acquisition in back scattering geometry (180 degrees).

6—A lens system, including focusing and magnifying lenses and iris to adjust incoming light intensity and coherence (pixel to speckle ratio).

7—A linear or circular polarizer to enable co-polarized or cross-polarized speckle collection.

8—A high speed CCD and/or CMOS camera for laser speckle acquisition.

9—A goniometer for mounting the camera to enable speckle acquisition at multiple polar angles for angle resolved acquisition.

10—A high speed computer to process the acquired speckle information.

In various embodiments the procedures may include one or more of the following aspects of post-processing procedures:

1—An algorithm for evaluating speckle intensity correlation function, $g_2(t)$ in either the time or frequency (e.g. using FFTs) domain to calculate speckle dynamics for subsequent measurement of sample mechanics.

2—An algorithm to enable calculating a temporally averaged speckle intensity profile to estimate sample optical properties.

3—An algorithm to enable processing of the photon count (fluence) profile to acquire at least radially averaged or azimuthally resolved averaged fluence to estimate optical properties and particle size distribution.

4—A Polarization Sensitive Correlation Transfer Monte Carlo Ray Tracing (PSCT-MCRT) algorithm to simulate backscattered average intensity and speckle intensity decorrelation for given sample optical and mechanical properties, as well as illumination and collection polarization states.

5—An algorithm to extract the ratio of speckle decorrelation rates at parallel and perpendicular polarization states.

6—An algorithm to map the decorrelation ratio at different time lags to the scattering particle size distribution.

7—A lookup table to extract the average size of scattering particles from the speckle decorrelation rate ratio at a specific lag time.

8—An algorithm to extract Complex viscoelastic modulus, $G^*(\omega)$ from the $g_2(t)$ based on experimentally evaluated particle size distribution.

Embodiments of the disclosed techniques enable estimation of the average particle size, as well as the scattering particle size distribution in the biological tissues and biomaterials in their native states, without the need for manipulating the sample. Currently, there are no imaging techniques that are suitable for estimating the size distribution of scattering particles within turbid materials, such as tissue, in a non-invasive manner. In the past researchers have used destructive techniques such as electron microscopy to assess the size scales of refractive index heterogeneities and mismatch that represent the size scales of scattering particle sizes. In addition, other optical approaches have been developed that allow for estimating the size distribution in extremely diluted liquid samples. Nevertheless, none of these techniques are applicable to live biological tissues and biomaterials in their native states. The approach proposed here enables sizing the scattering particles in both liquid and solid specimens, using non-ionizing light rays, without contacting the specimen or manipulating it in any way.

In various embodiments a probe to collect light from a sample may be placed near the skin surface of a subject and light may be transmitted through the subject's skin to obtain optical data as disclosed herein. These include for example, applications in skin pathologies, or for detecting sub-surface abnormalities, such as superficial tumors in breast, etc. . . . In other embodiments, the probe may be inserted under the skin (e.g. the probe may be inserted via a small bore needle, endoscope, or other surgical tool) and optical information may be obtained from tissues (e.g. breast tissue) in deep, typically inaccessible tissue or within luminal organs without having to transmit light through the skin itself.

In this approach, laser speckle patterns are elicited from endogenous microscopic particles of unknown size distribution and concentration within the tissue. These include the fibers and fibrils composing the extracellular matrices, the cellular membranes, organelles, and nuclei. As such the rate of dynamic laser speckle fluctuations is related to the kinetics of these light scattering particles. Pathogenesis of human disease often simultaneously alters both the size scales of these particles and the mechanical properties of the tissue environment, which together modulate the laser speckle dynamics. The current invention proposes an apparatus and algorithm in which the size distribution of these endogenous light scattering centers are calculated by obtaining either of the temporally-resolved or temporally-averaged speckle data, depending on the range of scattering particle sizes, in both micron and submicron ranges, and a polarization-sensitive correlation transfer Monte Carlo ray tracing (PSCT-MCRT) algorithm is implemented to evaluate and decouple the contribution of optical properties and particle size distribution from that of viscoelastic susceptibility of the tissue micro-environment. Using this approach, it is possible to extract both the size scales of scattering particles and their distributions as well as the complex viscoelastic modulus of the tissue microenvironment. The invaluable potential of Laser Speckle fluctuations in accurately evaluating both the size distribution of scattering particles and the complex viscoelastic modulus, $G(\omega)$, opens new avenues for cytological and mechanical analysis of tissues and biomaterials for clinical diagnosis, therapy monitoring, tissue engineering, and drug delivery applications, among others, where the capability to measure cellular content and viscoelastic properties becomes invaluable.

Various embodiments of these procedures may be implemented to apply this approach for estimating the size distribution of proteins, bio-polymers, and biomarkers, and for several in vitro and in vivo diagnostic applications to various basic science as well as clinical applications. Embodiments of these procedures may enable particle sizing in tissue specimens to identify neoplastic cells based on skewed scattering particle size distributions. This approach has been originally developed to enable estimating the viscoelastic modulus from the speckle fluctuation rate. By isolating the influence of scattering particle size distribution on the speckle signal, this approach allows for quantitative evaluation of the viscoelastic modulus as well. Therefore, the current approach may be commercialized in the form of hand held diagnostic sensors, probes, and imaging devices, as well as bench-top lab microscopes for simultaneous mapping of both tissue granularity and viscoelastic properties with optical resolution, in wide array of basic science and clinical medicine applications.

The present disclosure provides optical visco-elastography techniques which enable bridging the gap between clinical elastography and research grade, nano-scale indentation. Optical elasticity imaging modalities often make certain assumption about physical and mechanical attributes of the tissue, and LSM may quantitatively evaluate the viscoelastic modulus in breast lesions of unknown optical properties and scattering particle size. However, combining the newly proposed approach for particle sizing with previous techniques enables particle sizing over an extended range, pertinent to tissues and biomaterials.

Figure 14:
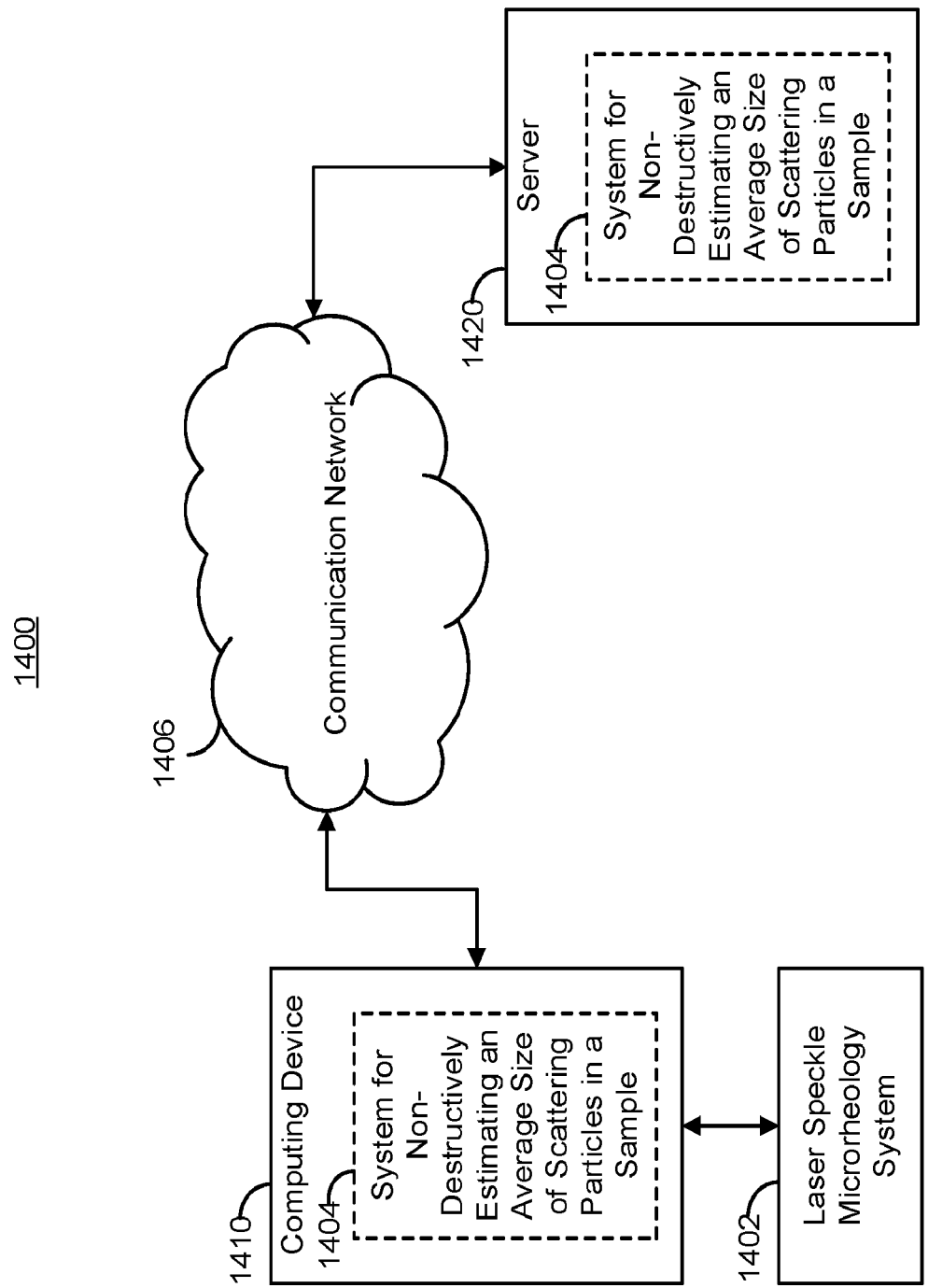
FIG. 14 shows an example of a system for providing a source for non-destructively estimating an average size of scattering particles in a sample in accordance with some embodiments of the disclosed subject matter.

Turning to FIG. 14, an example 1400 of a system (e.g. a data collection and processing system) for non-destructively estimating an average size of scattering particles in a sample is shown in accordance with some embodiments of the disclosed subject matter. In some embodiments, a computing device 1410 can execute at least a portion of a system for non-destructively estimating an average size of scattering particles in a sample 1404 and provide control signals to one or more optical components associated with a laser speckle microrheology (LSM) system 1402. Additionally or alternatively, in some embodiments, computing device 1410 can communicate information regarding the control signals to or from a server 1420 over a communication network 1406, which can execute at least a portion of system for non-destructively estimating an average size of scattering particles in a sample 1404. In some such embodiments, server 1420 can return information to computing device 1410 (and/or any other suitable computing device) relating to the control signals for system for non-destructively estimating an average size of scattering particles in a sample 1404. This information may be transmitted and/or presented to a user (e.g. a researcher, an operator, a clinician, etc.) and/or may be stored (e.g. as part of a research database or a medical record associated with a subject).

In some embodiments, computing device 1410 and/or server 1420 can be any suitable computing device or combination of devices, such as a desktop computer, a laptop computer, a smartphone, a tablet computer, a wearable computer, a server computer, a virtual machine being executed by a physical computing device, etc. As described herein, system for non-destructively estimating an average size of scattering particles in a sample 1404 can present information about the control signals to a user (e.g., researcher and/or physician). In some embodiments, LSM system 1402 may include optical components such as those disclosed herein (e.g. see FIG. 1A).

In some embodiments, communication network 1406 can be any suitable communication network or combination of communication networks. For example, communication network 1406 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, WiMAX, etc.), a wired network, etc. In some embodiments, communication network 1406 can be a local area network, a wide area network, a public network (e.g., the Internet), a private or semi-private network (e.g., a corporate or university intranet), any other suitable type of network, or any suitable combination of networks. Communications links shown in FIG. 14 can each be any suitable communications link or combination of communications links, such as wired links, fiber optic links, Wi-Fi links, Bluetooth links, cellular links, etc.

Figure 15:
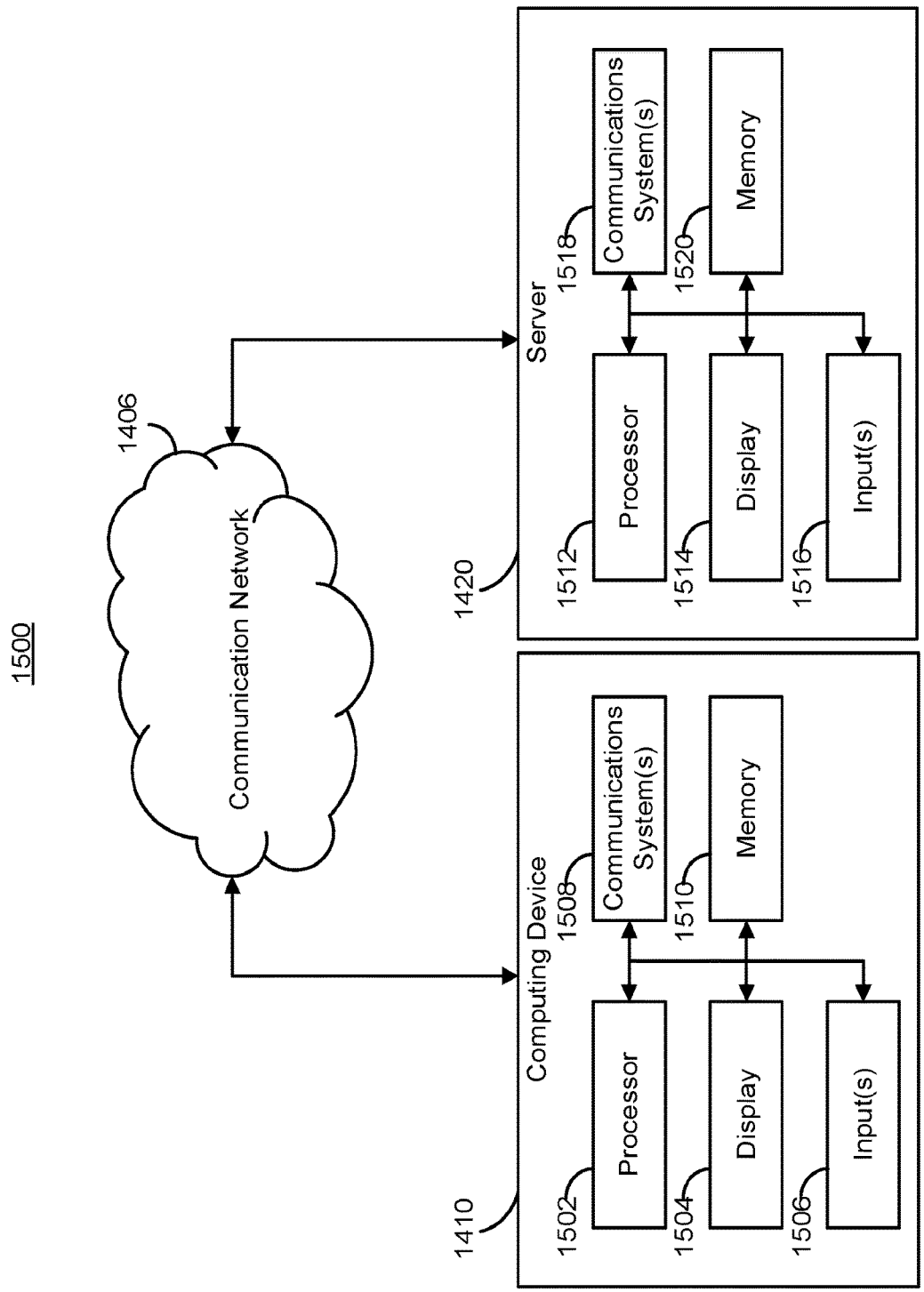
FIG. 15 shows an example of hardware that can be used to implement a computing device and server in accordance with some embodiments of the disclosed subject matter.

FIG. 15 shows an example 1500 of hardware that can be used to implement computing device 1410 and server 1420 in accordance with some embodiments of the disclosed subject matter. As shown in FIG. 15, in some embodiments, computing device 1410 can include a processor 1502, a display 1504, one or more inputs 1506, one or more communication systems 1508, and/or memory 1510. In some embodiments, processor 1502 can be any suitable hardware processor or combination of processors, such as a central processing unit, a graphics processing unit, etc. In some embodiments, display 1504 can include any suitable display devices, such as a computer monitor, a touchscreen, a television, etc. In some embodiments, inputs 1506 can include any suitable input devices and/or sensors that can be used to receive user input, such as a keyboard, a mouse, a touchscreen, a microphone, etc.

In some embodiments, communications systems 1508 can include any suitable hardware, firmware, and/or software for communicating information over communication network 1406 and/or any other suitable communication networks. For example, communications systems 1508 can include one or more transceivers, one or more communication chips and/or chip sets, etc. In a more particular example, communications systems 1508 can include hardware, firmware and/or software that can be used to establish a Wi-Fi connection, a Bluetooth connection, a cellular connection, an Ethernet connection, etc.

In some embodiments, memory 1510 can include any suitable storage device or devices that can be used to store instructions, values, etc., that can be used, for example, by processor 1502 to present content using display 1504, to communicate with server 1420 via communications system(s) 1508, etc. Memory 1510 can include any suitable volatile memory, non-volatile memory, storage, or any suitable combination thereof. For example, memory 1510 can include RAM, ROM, EEPROM, one or more flash drives, one or more hard disks, one or more solid state drives, one or more optical drives, etc. In some embodiments, memory 1510 can have encoded thereon a computer program for controlling operation of computing device 1410. In such embodiments, processor 1502 can execute at least a portion of the computer program to present content (e.g., images, user interfaces, graphics, tables, etc.), receive content from server 1420, transmit information to server 1420, etc.

In some embodiments, server 1420 can include a processor 1512, a display 1514, one or more inputs 1516, one or more communications systems 1518, and/or memory 1520. In some embodiments, processor 1512 can be any suitable hardware processor or combination of processors, such as a central processing unit, a graphics processing unit, etc. In some embodiments, display 1514 can include any suitable display devices, such as a computer monitor, a touchscreen, a television, etc. In some embodiments, inputs 1516 can include any suitable input devices and/or sensors that can be used to receive user input, such as a keyboard, a mouse, a touchscreen, a microphone, etc.

In some embodiments, communications systems 1518 can include any suitable hardware, firmware, and/or software for communicating information over communication network 1406 and/or any other suitable communication networks. For example, communications systems 1518 can include one or more transceivers, one or more communication chips and/or chip sets, etc. In a more particular example, communications systems 1518 can include hardware, firmware and/or software that can be used to establish a Wi-Fi connection, a Bluetooth connection, a cellular connection, an Ethernet connection, etc.

In some embodiments, memory 1520 can include any suitable storage device or devices that can be used to store instructions, values, etc., that can be used, for example, by processor 1512 to present content using display 1514, to communicate with one or more computing devices 1410, etc. Memory 1520 can include any suitable volatile memory, non-volatile memory, storage, or any suitable combination thereof. For example, memory 1520 can include RAM, ROM, EEPROM, one or more flash drives, one or more hard disks, one or more solid state drives, one or more optical drives, etc. In some embodiments, memory 1520 can have encoded thereon a server program for controlling operation of server 1420. In such embodiments, processor 1512 can execute at least a portion of the server program to transmit information and/or content (e.g., results of a tissue identification and/or classification, a user interface, etc.) to one or more computing devices 1410, receive information and/or content from one or more computing devices 1410, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

Figure 16:
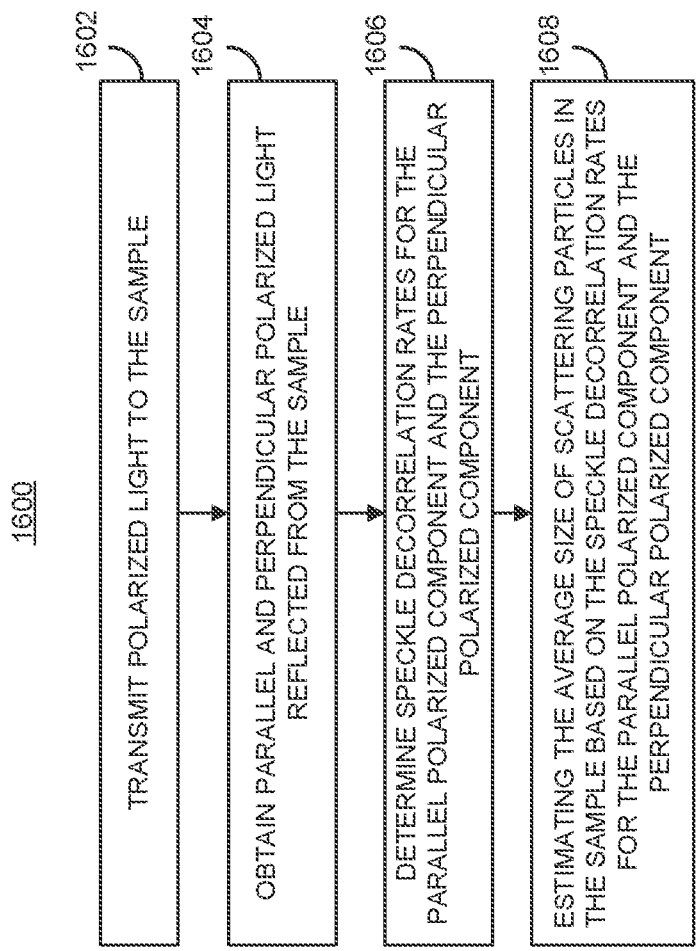
FIG. 16 shows an example of a process for non-destructively estimating an average size of scattering particles in a sample in accordance with some embodiments of the disclosed subject matter.

FIG. 16 shows an example 1600 of a process for non-destructively estimating an average size of scattering particles in a sample in accordance with some embodiments of the disclosed subject matter. As shown in FIG. 16, at 1602, process 1600 can transmit polarized light to the sample. The polarized light may be transmitted using a coherent light source such as a laser. At 1604, process 1600 can obtain polarized light reflected from the sample. The polarized light may include a parallel polarized component and a perpendicular polarized component. Obtaining polarized light reflected from the sample may be performed using a detector such as a camera. At 1606, process 1600 can determine speckle decorrelation rates for the parallel polarized component and the perpendicular polarized component Determining speckle decorrelation rates may be performed using a processor such as a computer processor. At 1208, process 1200 can estimate the average size of scattering particles in the sample based on the speckle decorrelation rates for the parallel polarized component and the perpendicular polarized component Estimating the average size of scattering particles can be performed using the processor.

It should be understood that the above described steps of the process of FIG. 16 can be executed or performed in any order or sequence not limited to the order and sequence shown and described in the figures. Also, some of the above steps of the processes of FIG. 16 can be executed or performed substantially simultaneously where appropriate or in parallel to reduce latency and processing times.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A method for non-destructively estimating an average size of scattering particles in a sample, comprising:

transmitting, using a coherent light source, polarized light to the sample;

obtaining, using a detector, polarized light reflected from the sample as a function of time, the polarized light comprising a parallel polarized component and a perpendicular polarized component;

determining, using a processor, speckle decorrelation rates for the parallel polarized component and the perpendicular polarized component, wherein determining the speckle decorrelation rates for the parallel polarized component and the perpendicular polarized component comprises determining relaxation curves for the parallel polarized component and the perpendicular polarized component based on the polarized light reflected from the sample as a function of time; and estimating, using the processor, the average size of scattering particles in the sample based on the relaxation curves for the parallel polarized component and the perpendicular polarized component.

2. The method of claim 1, wherein the detector comprises a plurality of pixels corresponding to a plurality of spatially-distributed locations within the sample, and wherein obtaining polarized light reflected from the sample comprises:

obtaining polarized light reflected from the sample across the plurality of pixels, wherein determining speckle decorrelation rates for the parallel polarized component and the perpendicular polarized component comprises:

determining speckle decorrelation rates for the parallel polarized component and the perpendicular polarized component for each of the plurality of pixels, and wherein estimating the average size of scattering particles in the sample comprises:

estimating the average size of scattering particles for each of the plurality of pixels corresponding to each of the plurality of spatially-distributed locations within the sample.

3. The method of claim 1, wherein estimating the average size of scattering particles in the sample based on the speckle decorrelation rates for the parallel polarized component and the perpendicular polarized component comprises:

estimating the average size of scattering particles in the sample based on determining a ratio of the relaxation curves for the parallel polarized component and the perpendicular polarized component of the polarized light reflected from the sample as a function of time.

4. The method of claim 1, wherein determining speckle decorrelation rates for the parallel polarized component and the perpendicular polarized component comprises:

determining speckle decorrelation rates for the parallel polarized component and the perpendicular polarized component based on a table of values.

5. The method of claim 4, wherein the table of values is generated based on a simulation of speckle density autocorrelation curves for a plurality of particle sizes.

6. The method of claim 5, wherein the simulation comprises a Polarization Sensitive Correlation Transfer Monte Carlo Ray Tracing simulation.

7. The method of claim 1, wherein transmitting linearly polarized light to the sample comprises:

transmitting linearly polarized light comprising a plurality of wavelengths to the sample; and wherein estimating the average size of scattering particles in the sample comprises:
estimating the average size of scattering particles in the sample based on transmitting linearly polarized light comprising a plurality of wavelengths to the sample.

8. The method of claim 1, wherein transmitting linearly polarized light to the sample comprises:
alternately transmitting parallel polarized light and perpendicular polarized light to the sample.

9. The method of claim 8, wherein alternately transmitting parallel polarized light and perpendicular polarized light to the sample comprises:
modulating between parallel polarized light and perpendicular polarized light using a polarization modulator in combination with an optical isolator or polarization isolator based on switching mirrors to select one of the parallel polarized light and the perpendicular polarized light.

10. The method of claim 1, wherein the polarized light comprises linearly polarized light.

11. An apparatus for non-destructively estimating an average size of scattering particles in a sample, comprising:
a coherent light source;
a detector; and
a processor in communication with the coherent light source and the detector, the processor being configured to:
control the coherent light source to transmit polarized light to the sample,
control the detector to obtain polarized light reflected from the sample,
the polarized light comprising a parallel polarized component and a perpendicular polarized component,
determine speckle decorrelation rates for the parallel polarized component and the perpendicular polarized component,
wherein determining the speckle decorrelation rates for the parallel polarized component and the perpendicular polarized component comprises determining relaxation curves for the parallel polarized component and the perpendicular polarized component based on the polarized light reflected from the sample as a function of time, and
estimate the average size of scattering particles in the sample based on the relaxation curves for the parallel polarized component and the perpendicular polarized component.

12. The apparatus of claim 11, wherein the detector comprises a plurality of pixels corresponding to a plurality of spatially-distributed locations within the sample, and
wherein the processor, when obtaining polarized light reflected from the sample, is further configured to:
obtain polarized light reflected from the sample across the plurality of pixels,
wherein the processor, when determining speckle decorrelation rates for the parallel polarized component and the perpendicular polarized component, is further configured to:
determine speckle decorrelation rates for the parallel polarized component and the perpendicular polarized component for each of the plurality of pixels, and wherein the processor, when estimating the average size of scattering particles in the sample, is further configured to:
estimate the average size of scattering particles for each of the plurality of pixels corresponding to each of the plurality of spatially-distributed locations within the sample.

13. The apparatus of claim 11, wherein the processor, when estimating the average size of scattering particles in the sample based on the speckle decorrelation rates for the parallel polarized component and the perpendicular polarized component, is further configured to:
estimate the average size of scattering particles in the sample based on determining a ratio of the relaxation curves for the parallel polarized component and the perpendicular polarized component of the polarized light reflected from the sample as a function of time.

14. The apparatus of claim 11, wherein the processor, when determining speckle decorrelation rates for the parallel polarized component and the perpendicular polarized component, is further configured to:
determine speckle decorrelation rates for the parallel polarized component and the perpendicular polarized component based on a table of values.

15. The apparatus of claim 14, wherein the table of values is generated based on a simulation of speckle density autocorrelation curves for a plurality of particle sizes.

16. The apparatus of claim 15, wherein the simulation comprises a Polarization Sensitive Correlation Transfer Monte Carlo Ray Tracing simulation.

17. The apparatus of claim 11, wherein the processor, when transmitting polarized light to the sample, is further configured to:
transmit polarized light comprising a plurality of wavelengths to the sample; and
wherein the processor, when estimating the average size of scattering particles in the sample, is further configured to:
estimate the average size of scattering particles in the sample based on transmitting polarized light comprising a plurality of wavelengths to the sample.

18. The apparatus of claim 11, wherein the processor, when transmitting polarized light to the sample, is further configured to:
alternately transmit parallel polarized light and perpendicular polarized light to the sample.

19. The apparatus of claim 18, wherein the processor, when alternately transmitting parallel polarized light and perpendicular polarized light to the sample, is further configured to:
modulate between parallel polarized light and perpendicular polarized light using a polarization modulator in combination with an optical isolator or polarization isolator based on switching mirrors to select one of the parallel polarized light and the perpendicular polarized light.

20. The apparatus of claim 11, wherein the polarized light comprises linearly polarized light.

* * * * *